United States Patent
Nagao et al.

(10) Patent No.: US 9,447,323 B2
(45) Date of Patent: Sep. 20, 2016

(54) METHOD FOR PRODUCING LIQUID CRYSTAL DISPLAY

(71) Applicant: JSR CORPORATION, Tokyo (JP)

(72) Inventors: Takashi Nagao, Tokyo (JP); Yoshikazu Miyamoto, Tokyo (JP); Hiroaki Tokuhisa, Tokyo (JP); Michinori Nishikawa, Tokyo (JP)

(73) Assignee: JSR CORPORATION, Tokyo (JP)

( * ) Notice: Subject to any disclaimer, the term of this patent is extended or adjusted under 35 U.S.C. 154(b) by 86 days.

(21) Appl. No.: 14/190,643

(22) Filed: Feb. 26, 2014

(65) Prior Publication Data

US 2014/0173893 A1 Jun. 26, 2014

Related U.S. Application Data

(63) Continuation of application No. PCT/JP2012/066775, filed on Jun. 29, 2012.

(30) Foreign Application Priority Data

Aug. 31, 2011 (JP) ................................. 2011-189945

(51) Int. Cl.
*G02F 1/13* (2006.01)
*C09K 19/56* (2006.01)
(Continued)

(52) U.S. Cl.
CPC .............. *C09K 19/56* (2013.01); *C09D 183/08* (2013.01); *G02F 1/133788* (2013.01); *C08G 77/14* (2013.01); *C08G 77/388* (2013.01); *Y10T 29/49124* (2015.01)

(58) Field of Classification Search
CPC ............ G02F 1/133711; C09K 19/56; C09K 19/3809
See application file for complete search history.

(56) References Cited

U.S. PATENT DOCUMENTS 4,376,715 A * 3/1983 Cognard ................... C09B 1/20
 252/301.16
4,428,858 A * 1/1984 Cognard .............. C09K 19/603
 252/299.1
(Continued)

FOREIGN PATENT DOCUMENTS

CN 101802691 8/2010
JP 63-291922 11/1988
(Continued)

OTHER PUBLICATIONS

"1st Office Action of China Counterpart Application", with English translation thereof, issued on Aug. 17, 2015, p. 1-p. 14.
(Continued)

*Primary Examiner* — Minh Trinh
(74) *Attorney, Agent, or Firm* — Jianq Chyun IP Office

(57) ABSTRACT

A method for producing a liquid crystal display includes providing a first substrate having a first electrode and a second electrode on a surface of the first substrate. The first and the second electrodes are made of conductive films. A liquid crystal aligning agent is applied to the surface of the first substrate to form an alignment film on the first substrate. The liquid crystal aligning agent includes at least one of: a polymer that includes a photoalignment structure and a polymerizable carbon-carbon double bond; a polymer that includes a photoalignment structure, and a component that includes a polymerizable carbon-carbon double bond; or a polymer that includes a photoalignment structure and a polymerizable carbon-carbon double bond, and a component that includes a polymerizable carbon-carbon double bond. The second substrate is provided to form a liquid crystal cell. Light is applied to the liquid crystal cell.

5 Claims, 2 Drawing Sheets

(51) Int. Cl.
*G02F 1/1337* (2006.01)
*C09D 183/08* (2006.01)
*C08G 77/14* (2006.01)
*C08G 77/388* (2006.01)

(56) References Cited

U.S. PATENT DOCUMENTS

| | | | | |
|---|---|---|---|---|
| 5,699,135 | A * | 12/1997 | Hisatake | G02F 1/133504 349/106 |
| 5,818,558 | A * | 10/1998 | Ogishima | G02F 1/133753 349/110 |
| 2003/0036624 | A1* | 2/2003 | Liu | G02F 1/133723 528/170 |
| 2004/0009310 | A1 | 1/2004 | Nakata et al. | |
| 2012/0026440 | A1 | 2/2012 | Suwa et al. | |
| 2012/0133871 | A1* | 5/2012 | Saigusa | G02B 5/3083 349/108 |
| 2012/0229744 | A1* | 9/2012 | Hattori | C08F 2/50 349/124 |

FOREIGN PATENT DOCUMENTS

| | | |
|---|---|---|
| JP | 2002-250924 | 9/2002 |
| JP | 2003-307736 | 10/2003 |
| JP | 2004-83810 | 3/2004 |
| JP | 2004-163646 | 6/2004 |
| JP | 2010-97188 | 4/2010 |
| JP | 2010-217868 | 9/2010 |
| JP | 2012-32601 | 2/2012 |
| JP | 2012-141567 | 7/2012 |
| KR | 1020040083014 | 9/2004 |
| KR | 20100051770 | 5/2010 |
| KR | 20100132436 | 12/2010 |
| WO | WO 2009/025385 | 2/2009 |
| WO | WO 2010/087280 | 8/2010 |

OTHER PUBLICATIONS

International Search Report for corresponding International Application No. PCT/JP2012/066775, Oct. 9, 2012.
"2nd Office Action of China Counterpart Application", with English translation thereof, issued on Jan. 5, 2016, p. 1-p. 6.
"Office Action of Korea Counterpart Application", issued on Oct. 27, 2015, p. 1-p. 7, with English translation thereof.
"Office Action of Taiwanese Counterpart Application", issued on Oct. 15, 2015, with partial English translation thereof, pp. 1-8.
"Office Action of Korea Counterpart Application," issued on Apr. 14, 2016, with English translation thereof, p. 1-p. 6.
Office Action of Korea Counterpart Application with machine English translation, issued on Jun. 1, 2016, p. 1-p. 7.

* cited by examiner

METHOD FOR PRODUCING LIQUID CRYSTAL DISPLAY

CROSS-REFERENCE TO RELATED APPLICATIONS

The present application is a continuation application of International Application No. PCT/JP2012/066775, filed Jun. 29, 2012, which claims priority to Japanese Patent Application No. 2011-189945, filed Aug. 31, 2011. The contents of these applications are incorporated herein by reference in their entirety.

BACKGROUND OF THE INVENTION

1. Field of the Invention

The present invention relates to a method for producing a liquid crystal display, a liquid crystal aligning agent, a liquid crystal aligning film, and a liquid crystal device.

2. Discussion of the Background

A horizontal alignment-mode liquid crystal display that utilizes a nematic liquid crystal having positive dielectric anisotropy (e.g., twisted nematic (TN)-mode or super twisted nematic (STN)-mode liquid crystal display), and a vertical alignment (VA)-mode liquid crystal display (homeotropic alignment mode) that utilizes a nematic liquid crystal having negative dielectric anisotropy have been known. An in-plane switching liquid crystal display having a configuration in which an electrode is formed on only one of a pair of substrates disposed opposite to each other, and an electric field is applied parallel to the substrate has also been known. Note that the term "in-plane switching liquid crystal display" used herein includes an in-plane switching (IPS)-mode liquid crystal display, a fringe field switching (FFS)-mode liquid crystal display, and a liquid crystal display that utilizes a principle similar to those of these liquid crystal displays.

The in-plane switching liquid crystal display has a wide viewing angle, and achieves high-quality display as compared with the horizontal alignment-mode liquid crystal display, the VA-mode liquid crystal display, and the like. The in-plane switching liquid crystal display achieves a wide viewing angle and high contrast when the pretilt angle is small. Therefore, when implementing the in-plane switching liquid crystal display, it is desirable that the pretilt angle be small in a state in which an electric field is not applied.

A liquid crystal display is designed so that a liquid crystal alignment film is formed on the surface of a substrate in order to align the liquid crystal molecules in a given direction relative to the surface of the substrate. In recent years, a photoalignment method that implements a liquid crystal alignment capability by applying polarized or unpolarized radiation to a radiation-sensitive organic thin film formed on the surface of the substrate has been proposed to replace a rubbing method that rubs the surface of an organic film surface formed on the surface of the substrate in one direction using a fabric material such as rayon (see Japanese Patent Application Publication (KOKAI) No. 2003-307736, Japanese Patent Application Publication (KOKAI) No. 2004-163646, Japanese Patent Application Publication (KOKAI) No. 2002-250924, Japanese Patent Application Publication (KOKAI) No. 2004-83810, and Japanese Patent Application Publication (KOKAI) No. 2010-217868). A uniform liquid crystal alignment film can be formed using the photoalignment method while suppressing formation of dust and generation of static electricity during the process. Moreover, a liquid crystal alignment capability can be provided to only an arbitrary area of the organic thin film by applying radiation through an appropriate photomask, and a plurality of areas that differ in liquid crystal alignment direction can be provided to a single organic thin film by utilizing a method that applies radiation a plurality of times while changing the irradiation direction or the direction of the polarization axis, or combining such a method with a method that utilizes a photomask. In principle, a liquid crystal alignment film formed by the photoalignment method can achieve a pretilt angle of 0° by applying polarized radiation in the direction normal (vertical) to the surface of the substrate, for example. This makes it possible to produce a high-quality display.

It is desirable to produce an in-plane switching liquid crystal display using the photoalignment method in view of the above advantages. However, since an in-plane switching liquid crystal display produced using the photoalignment method may show a residual image and a burn-in phenomenon, it is important to suppress a residual image and a burn-in phenomenon. In particular, a difference in brightness due to a temporal change in alignment state is observed as a burn-in phenomenon. Since a liquid crystal display can achieve high-brightness display, and may be used outdoors in the daytime, the liquid crystal display and the liquid crystal alignment film included in the liquid crystal display may be exposed to intense UV light for a long time. Therefore, it has become important to improve the UV resistance of the liquid crystal alignment film.

The in-plane switching liquid crystal display that achieves high-quality display irrespective of the viewing angle has been widely used as a medical display, a large-scale display, a small display for portable terminals, and the like. In recent years, development of a display that can achieve high-quality display irrespective of the viewing angle, and can be mass-produced has been strongly desired along with the development of new media such as a tablet PC and a smartphone.

In view of the above situation, it has been desired to provide a liquid crystal aligning agent that can form a liquid crystal alignment film that is used for the in-plane switching liquid crystal display, and ensures that the above advantageous effects due to the photoalignment method are sufficiently achieved, a residual image and a burn-in phenomenon are sufficiently suppressed, and a decrease in voltage holding ratio rarely occurs even when the liquid crystal display (liquid crystal alignment film) is exposed to intense UV light.

SUMMARY OF THE INVENTION

According to one aspect of the present invention, a method for producing a liquid crystal display includes providing a first substrate having a first electrode and a second electrode on a surface of the first substrate, the first electrode and the second electrode being made of conductive films. A liquid crystal aligning agent is applied to the surface of the first substrate to form an alignment film on the first substrate, the liquid crystal aligning agent including at least one of: a polymer that includes a photoalignment structure and a polymerizable carbon-carbon double bond; a polymer that includes a photoalignment structure, and a component that includes a polymerizable carbon-carbon double bond; or a polymer that includes a photoalignment structure and a polymerizable carbon-carbon double bond, and a component that includes a polymerizable carbon-carbon double bond. A second substrate is provided to sandwich a liquid crystal layer between the alignment film on the first substrate and the second substrate to form a liquid crystal cell, the liquid crystal layer including liquid crystal molecules. Light is applied to the liquid crystal cell in a state in which a voltage that does not drive the liquid crystal molecules included in the liquid crystal layer is applied between the first electrode and the second electrode, or in a state in which a voltage is not applied between the first electrode and the second electrode.

According to another aspect of the present invention, a liquid crystal aligning agent includes a polymer that includes a photoalignment structure and a polymerizable carbon-carbon double bond.

According to further aspect of the present invention, a liquid crystal aligning agent includes a polymer that includes a photoalignment structure, and a component that includes a polymerizable carbon-carbon double bond.

According to further aspect of the present invention, a liquid crystal aligning agent includes a polymer that includes a photoalignment structure and a polymerizable carbon-carbon double bond, and a component that includes a polymerizable carbon-carbon double bond.

According to further aspect of the present invention, a liquid crystal alignment film is formed using the liquid crystal aligning agent.

According to further aspect of the present invention, a liquid crystal device includes the liquid crystal alignment film.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

DESCRIPTION OF EMBODIMENTS

Figure 1:
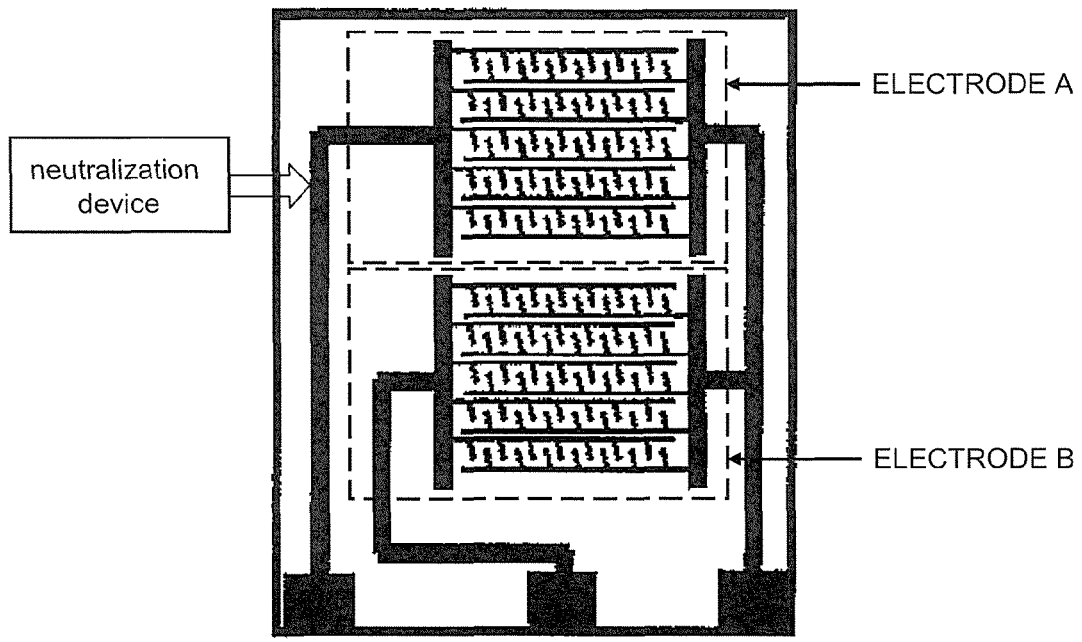
FIG. 1 is a view illustrating the pattern of a conductive film formed on a substrate that was used in the examples and comparative examples.

According to one embodiment of the invention, a method for producing a liquid crystal display includes: applying a liquid crystal aligning agent to a side of a first substrate to form a film, a pair of electrodes being formed on the side of the first substrate using a conductive film, and the liquid crystal aligning agent being at least one liquid crystal aligning agent selected from a group consisting of [A] a liquid crystal aligning agent that includes a polymer that includes a photoalignment structure and a polymerizable carbon-carbon double bond, [B] a liquid crystal aligning agent that includes a polymer that includes a photoalignment structure, and a component that includes a polymerizable carbon-carbon double bond, and [C] a liquid crystal aligning agent that includes a polymer that includes a photoalignment structure and a polymerizable carbon-carbon double bond, and a component that includes a polymerizable carbon-carbon double bond; forming a liquid crystal cell that is configured so that the film formed on the first substrate is positioned opposite to a second substrate through a liquid crystal layer that is formed using liquid crystal molecules; and applying light to the liquid crystal cell in a state in which a specific voltage that does not drive the liquid crystal molecules included in the liquid crystal layer is applied between the pair of electrodes, or a voltage is not applied between the pair of electrodes.

A liquid crystal display produced by the above method exhibits excellent liquid crystal alignment properties and excellent burn-in resistance, and rarely shows a deterioration in electrical properties due to continuous drive for a long time. The above method may particularly suitably be used to produce an in-plane switching liquid crystal display (e.g., IPS-mode liquid crystal display or FFS-mode liquid crystal display).

The light may be applied to the liquid crystal cell in a state in which the pair of electrodes are electrically disconnected, and a voltage is not applied between the pair of electrodes. Alternatively, the light may be applied to the liquid crystal cell in a state in which a voltage of 0 V is applied between the pair of electrodes as the specific voltage, or may be applied to the liquid crystal cell in a state in which the pair of electrodes are electrically connected, and a voltage is not applied between the pair of electrodes. The effects of charge due to static electricity or the like can be reduced by applying the light to the liquid crystal cell in a state in which a voltage of 0 V is applied between the pair of electrodes, or in a state in which the pair of electrodes are electrically connected (short-circuited), and a voltage is not applied between the pair of electrodes. In order to further reduce the effects of charge, it is preferable to remove electricity from the liquid crystal cell using a neutralization device before the light is applied to the liquid crystal cell, or when the light is applied to the liquid crystal cell.

According to another embodiment of the invention, a liquid crystal aligning agent [A] includes a polymer that includes a photoalignment structure and a polymerizable carbon-carbon double bond. According to another embodiment of the invention, a liquid crystal aligning agent [B] includes a polymer that includes a photoalignment structure, and a component that includes a polymerizable carbon-carbon double bond. According to another embodiment of the invention, a liquid crystal aligning agent [C] includes a polymer that includes a photoalignment structure and a polymerizable carbon-carbon double bond, and a component that includes a polymerizable carbon-carbon double bond.

The liquid crystal aligning agent that includes the above specific polymer ensures excellent liquid crystal alignment properties and excellent burn-in resistance, and suppresses a deterioration in electrical properties due to continuous drive for a long time when applied to a liquid crystal display. In particular, the above effects can be more advantageously achieved by utilizing the liquid crystal aligning agent when producing an in-plane switching liquid crystal display.

According to another embodiment of the invention, a liquid crystal alignment film is formed using the liquid crystal aligning agent. The liquid crystal alignment film formed using the liquid crystal aligning agent ensures excellent liquid crystal alignment properties and excellent burn-in resistance, and suppresses a deterioration in electrical properties due to continuous drive for a long time. According to another embodiment of the invention, a liquid crystal alignment film includes the liquid crystal alignment film.

A liquid crystal aligning agent, a liquid crystal display, and a method for producing the same according to exemplary embodiments of the invention are described below.

Liquid Crystal Aligning Agent

A liquid crystal aligning agent according to one embodiment of the invention is at least one liquid crystal aligning agent selected from the group consisting of [A] a liquid crystal aligning agent that includes a polymer that includes a photoalignment structure and a polymerizable carbon-carbon double bond, [B] a liquid crystal aligning agent that includes a polymer that includes a photoalignment structure, and a component that includes a polymerizable carbon-carbon double bond, and [C] a liquid crystal aligning agent that includes a polymer that includes a photoalignment structure and a polymerizable carbon-carbon double bond, and a component that includes a polymerizable carbon-carbon double bond.

The term "photoalignment structure" used herein includes a photoalignment group and a photodecomposition alignment part. The photoalignment structure may be a group derived from a compound that exhibits photoalignment properties (photoalignment capability) through photoisomerization, photodimerization, photodecomposition, or the like. Examples of such a group include an azobenzene-containing group that includes azobenzene or a derivative thereof as a basic skeleton, a cinnamic acid structure-containing group that includes cinnamic acid or a derivative thereof as a basic skeleton, a chalcone-containing group that includes chalcone or a derivative thereof as a basic skeleton, a benzophenone-containing group that includes benzophenone or a derivative thereof as a basic skeleton, a coumarin-containing group that includes coumarin or a derivative thereof as a basic skeleton, a polyimide-containing structure that includes polyimide or a derivative thereof as a basic skeleton, and the like.

The polymer that includes a photoalignment structure and the polymer that includes a photoalignment structure and a polymerizable carbon-carbon double bond (hereinafter may be collectively referred to as "specific polymer") included in the liquid crystal aligning agents [A], [B], and [C] may be at least one polymer selected from the group consisting of [a] a polymer that includes a photoalignment group in the side chain (hereinafter may be referred to as "polymer [a]"), [b] a polymer that includes a photoalignment group in the main chain (hereinafter may be referred to as "polymer [b]"), and [c] a polymer that exhibits photodecomposition alignment properties (hereinafter may be referred to as "polymer [c]").

Polymer [a]

Examples of the polymer [a] include a polymer that includes a polyamic acid skeleton, a polyimide skeleton, a polyorganosiloxane skeleton, or the like as the main-chain skeleton. It is preferable to use a polyorganosiloxane (hereinafter may be referred to as "polyorganosiloxane [a]") as the polymer [a].

The photoalignment group included in the polymer [a] is preferably a cinnamic acid structure-containing group that includes cinnamic acid or a derivative thereof as a basic skeleton taking account of excellent alignment properties and ease of introduction of a polyorganosiloxane skeleton or the like into the main-chain skeleton.

The polymer [a] may be produced by an arbitrary method. For example, a polyorganosiloxane that includes a photoalignment group in the side chain may be produced by reacting a polyorganosiloxane that includes an epoxy group (hereinafter may be referred to as "epoxy group-containing polyorganosiloxane") with at least one compound selected from the group consisting of a carboxylic acid that includes a photoalignment group, such as a compound represented by the following formula (A1) and a compound represented by the following formula (A2). A polymerizable carbon-carbon double bond may be incorporated in the polymer using a known method. For example, a polymerizable carbon-carbon double bond may be incorporated in the polymer using the method disclosed in Japanese Patent Application No. 2011-095224.

More specifically, the polymer that includes a photoalignment structure and a polymerizable carbon-carbon double bond that is included in the liquid crystal aligning agents [A] and [C] may be produced by (i) subjecting a hydrolyzable silane compound (s1) that includes an epoxy group and a hydrolyzable silane compound (s2) that includes a polymerizable carbon-carbon double bond to hydrolysis and condensation to obtain an epoxy group-containing polyorganosiloxane, and reacting the epoxy group-containing polyorganosiloxane with a carboxylic acid that includes a photoalignment group, or (ii) hydrolyzing a silane compound including the silane compound (s1) to obtain an epoxy group-containing polyorganosiloxane, and reacting the epoxy group-containing polyorganosiloxane with a carboxylic acid including a carboxylic acid that includes a photoalignment group and a carboxylic acid that includes a polymerizable carbon-carbon double bond, for example.

The polymer that includes a photoalignment structure that is included in the liquid crystal aligning agent [B] may be produced by (i) subjecting a silane compound that excludes the silane compound (s2), and includes the silane compound (s1) to hydrolysis and condensation to obtain an epoxy group-containing polyorganosiloxane, and reacting the epoxy group-containing polyorganosiloxane with a carboxylic acid that excludes a carboxylic acid that includes a polymerizable carbon-carbon double bond, and includes a carboxylic acid that includes a photoalignment group, for example.

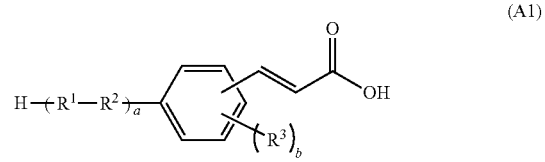

(A1)

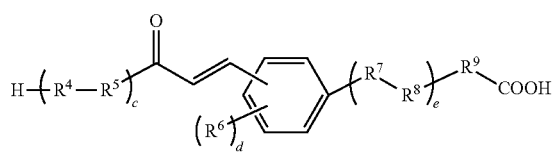

(A2)

wherein $R^1$ is a phenylene group, a biphenylene group, a terphenylene group, a cyclohexylene group, an alkanediyl group having 1 to 5 carbon atoms, or a group obtained by substituting at least some of the hydrogen atoms of a phenylene group, a biphenylene group, a terphenylene group, or a cyclohexylene group with an alkyl group having 1 to 10 carbon atoms, an alkoxy group having 1 to 10 carbon atoms, a monovalent group obtained by substituting at least some of the hydrogen atoms of the alkoxy group with a fluorine atom, a fluorine atom, or a cyano group, $R^2$ is a single bond, an alkanediyl group having 1 to 3 carbon atoms, an oxygen atom, a sulfur atom, —CH=CH—, —NH—, *—COO—, *—OCO—, *—CH$_2$—O—, or *—O—CH$_2$— (wherein * is a bonding site bonded to R$^1$), a is an integer from 0 to 3, provided that a plurality of R$^1$ and a plurality of R$^2$ are respectively either identical or different when a is an integer equal to or larger than 2, R$^3$ is a fluorine atom or a cyano group, b is an integer from 0 to 4, provided that a plurality of R$^3$ are either identical or different when b is an integer equal to or larger than 2, R$^4$ is a phenylene group, a cyclohexylene group, an alkanediyl group having 1 to 5 carbon atoms, or a group obtained by substituting at least some of the hydrogen atoms of a phenylene group, or a cyclohexylene group with an alkyl group having 1 to 10 carbon atoms, an alkoxy group having 1 to 10 carbon atoms, a monovalent group obtained by substituting at least some of the hydrogen atoms of the alkoxy group with a fluorine atom, a fluorine atom, or a cyano group, R$^5$ is a single bond, an alkanediyl group having 1 to 3 carbon atoms, an oxygen atom, a sulfur atom, or —NH—, c is an integer from 1 to 3, provided that a plurality of R$^4$ and a plurality of R$^5$ are respectively either identical or different when c is an integer equal to or larger than 2, R$^6$ is a fluorine atom or a cyano group, d is an integer from 0 to 4, provided that a plurality of R$^6$ are either identical or different when d is an integer equal to or larger than 2, R$^7$ is an oxygen atom, —COO—*, or —OCO—* (wherein * is a bonding site bonded to R$^8$), R$^8$ is a divalent aromatic group, a divalent alicyclic group, a divalent heterocyclic group, or a divalent fused ring group, e is an integer from 0 to 3, provided that a plurality of R$^7$ and a plurality of R$^8$ are respectively either identical or different when e is an integer equal to or larger than 2, R$^9$ is a single bond, —OCO—(CH$_2$)$_f$—*, or —O(CH$_2$)$_g$—* (wherein * is a bonding site bonded to the carboxyl group), and f and g are independently an integer from 1 to 12.

R$^1$ in the formula (A1) is preferably a phenylene group, a substituted phenylene group, a cyclohexylene group, a substituted cyclohexylene group, or an alkanediyl group having 1 to 3 carbon atoms. R$^2$ is preferably a single bond, an oxygen atom, —CH=CH—, *—CH$_2$—O—, or *—O—CH$_2$—.

Examples of the compound represented by the formula (A1) include the compounds respectively represented by the following formulas (A1-1) to (A1-5), and the like.

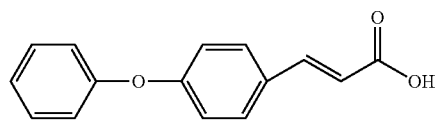

(A1-1)

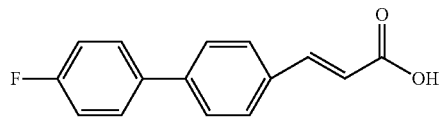

(A1-2)

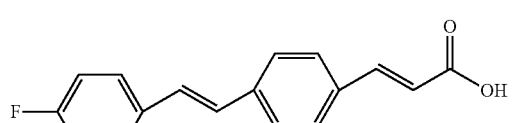

(A1-3)

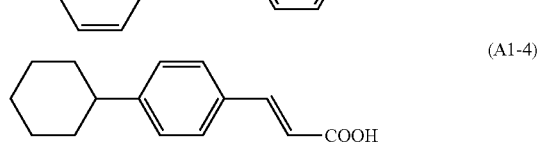

(A1-4)

(A1-5)

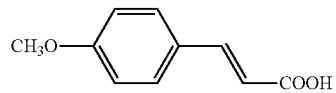

R$^4$ in the formula (A2) is preferably a phenylene group, a cyclohexylene group, a divalent group in which a benzene ring is bonded to a cyclohexane ring (—C$_6$H$_{10}$—C$_6$H$_4$—), or an alkanediyl group having 1 to 3 carbon atoms. R$^5$ is preferably a single bond or an oxygen atom, and more preferably an oxygen atom. Examples of the divalent aromatic group represented by R$^8$ include a phenylene group, a biphenylene group, a methylphenylene group, and the like. Examples of the divalent alicyclic group represented by R$^8$ include a cyclohexylene group, a bicyclohexylene group, and the like. Examples of the divalent heterocyclic group represented by R$^8$ include a piperidylene group, a pyridylene group, a piperazinediyl group, and the like. Examples of the divalent fused ring group represented by R$^8$ include a naphthylene group and the like. R$^9$ is preferably a single bond or —O—(CH$_2$)$_g$—*, and more preferably a single bond. e is preferably 0.

Examples of the compound represented by the formula (A2) include the compounds respectively represented by the following formulas (A2-1) and (A2-2), and the like.

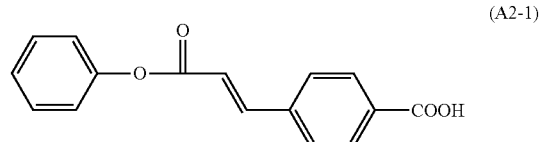

(A2-1)

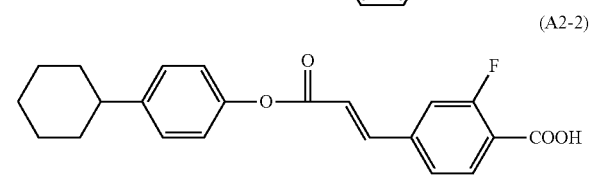

(A2-2)

The compound represented by the formula (A1) or (A2) may be synthesized by an arbitrary method. The compound represented by the formula (A1) or (A2) may be synthesized by appropriately combining normal methods in organic chemistry. For example, the compound represented by the formula (A1) or (A2) may be synthesized by (i) reacting a compound that includes a benzene ring skeleton substituted with a halogen atom with acrylic acid in the presence of a transition metal catalyst under basic conditions, or (ii) reacting a compound obtained by substituting the benzene ring of cinnamic acid or a derivative thereof with a halogen atom, with a compound that includes a benzene ring skeleton substituted with a halogen atom in the presence of a transition metal catalyst under basic conditions.

The epoxy group-containing polyorganosiloxane may be produced by an arbitrary method as long as the above polymer can be synthesized. For example, the epoxy group-containing polyorganosiloxane may be produced using the method disclosed in Japanese Patent Application No. 2011-073830.

The structure of the silane compound (s1) used to synthesize the epoxy group-containing polyorganosiloxane is not particularly limited as long as the silane compound (s1)

includes an epoxy group. It is preferable that the silane compound (s1) include a group represented by the following formula (ep-1) or (ep-2).

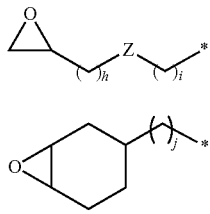

(ep-1)

(ep-2)

wherein Z is a single bond or an oxygen atom, h is an integer from 1 to 3, i is an integer from 0 to 6, provided that Z is a single bond when i is 0, j is an integer from 1 to 6, and * is a bonding site bonded to the silicon atom.

Specific examples of a preferable silane compound (s1) include glycidyloxy-3-glycidyloxypropyltrimethoxysilane, 3-glycidyloxypropyltriethoxysilane, 3-glycidyloxypropylmethyldimethoxysilane, 3-glycidyloxypropylmethyldiethoxysilane, 3-glycidyloxypropyldimethyl methoxysilane, 3-glycidyloxypropyldimethylethoxysilane, 2-(3,4-epoxycyclohexyl)ethyltrimethoxysilane, 2-(3,4-epoxycyclohexyl)ethyltriethoxysilane, the compound represented by the following formula (s1-1), the compound represented by the following formula (s1-2), and the like.

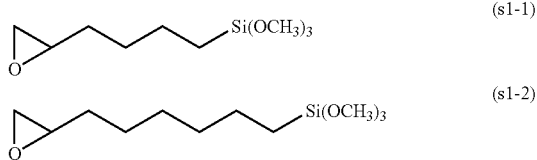

(s1-1)

(s1-2)

Among these, at least one of 2-(3,4-epoxycyclohexyl) ethyltrimethoxysilane, 3-glycidyloxypropyltrimethoxysilane, the compound represented by the formula (s1-1), and the compound represented by the formula (s1-2) may particularly preferably be used. These silane compounds (s1) may be used either alone or in combination.

An additional silane compound other than the silane compound (s1) may also be used when synthesizing the epoxy group-containing polyorganosiloxane. Examples of the additional silane compound include tetramethoxysilane, tetraethoxysilane, methyltrimethoxysilane, methyltriethoxysilane, phenyltrimethoxysilane, phenyltriethoxysilane, 3-mercaptopropyltrimethoxysilane, 3-mercaptopropyltriethoxysilane, mercaptomethyltrimethoxysilane, mercaptomethyltriethoxysilane, dimethyldimethoxysilane, dimethyldiethoxysilane, and the like. These additional silane compounds may be used either alone or in combination.

The silane compound (s2) that includes a group that includes a polymerizable carbon-carbon double bond may be used as the additional silane compound. When the epoxy group-containing polyorganosiloxane is synthesized using the silane compound (s2), a polyorganosiloxane that includes a polymerizable carbon-carbon double bond in the side chain can be obtained.

Examples of the group that is included in the silane compound (s2) and includes a polymerizable carbon-carbon double bond include a group represented by the following formula (A), and the like.

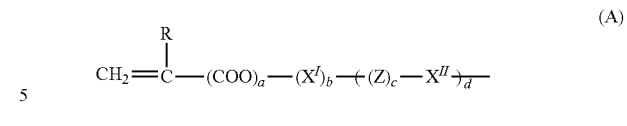

(A)

wherein R is a hydrogen atom or a methyl group, $X^I$ and $X^{II}$ are independently a phenylene group, a cyclohexylene group, a methylene group, or an alkylene group having 2 to 8 carbon atoms, Z is an oxygen atom, —COO—*, or —OCO—* (wherein * is a bonding site bonded to $X^{II}$), a, b, and c are independently 0 or 1, and d is an integer from 0 to 12, provided that d is 0 when b is 0.

Z in the formula (A) is preferably an oxygen atom.

Specific examples of the group represented by the formula (A) include a vinyl group, an allyl group, a p-styryl group, a (meth)acryloxymethyl group, a 2-((meth)acryloxy)ethyl group, a 3-((meth)acryloxy)propyl group, a 4-((meth)acryloxy)butyl group, a 5-((meth)acryloxy)pentyl group, a 6-((meth)acryloxy)hexyl group, a 7-((meth)acryloxy)heptyl group, a 8-((meth)acryloxy)octyl group, a 9-((meth)acryloxy)nonyl group, a 10-((meth)acryloxy)decyl group, a 4-(2-((meth)acryloxy)ethyl)phenyl group, a 2-((4-(meth)acryloxy)phenyl)ethyl group, a 4-((meth)acryloxymethyl)phenyl group, a 4-(meth)acryloxyphenylmethyl group, a 4-(3-((meth)acryloxy)propyl)phenyl group, a 3-(4-(meth)acryloxyphenyl)propyl group, a 4-((meth)acryloxymethoxy) phenyl group, a 4-(2-((meth)acryloxy)ethoxy)phenyl group, a 4-(3-((meth)acryloxy)propoxy)phenyl group, a (meth) acryloxymethoxymethyl group, a 2-((meth)acryloxymethoxy)ethyl group, a 2-(2-((meth)acryloxy)ethoxy) ethyl group, a 2-(2-(2-((meth)acryloxy)ethoxy)ethoxy)ethyl group, a 3-(3-((meth)acryloxy)propoxy)propyl group, a acryloxymethyl group, a 6-{[6-(acryloyloxy)hexanoyl] oxy}hexyl group, and the like. Among these, a vinyl group, an allyl group, a p-styryl group, a (meth)acryloxymethyl group, a 2-((meth)acryloxy)ethyl group, a 3-((meth)acryloxy)propyl group, a 6-{[6-(acryloyloxy)hexanoyl] oxy}hexyl group, and the like are preferable. Note that the term "(meth)acryloxy" used herein refers to acryloxy and methacryloxy.

Specific examples of the silane compound (s2) that includes the group represented by the formula (A) include 3-(meth)acryloxypropyltrimethoxysilane, 3-(meth)acryloxyprophyltriethoxysilane, and the like.

Hydrolysis and Condensation of Silane Compound

When synthesizing the polyorganosiloxane, hydrolysis and condensation of the silane compound may be implemented by reacting one silane compound or two or more silane compounds with water preferably in the presence of an appropriate catalyst and an organic solvent.

When synthesizing the polyorganosiloxane, the silane compound (s1) is preferably used in an amount of 30 mass % or more, more preferably 40 mass % or more, and still more preferably 50 mass % or more, based on the total amount of the silane compounds used for the reaction. The silane compound (s2) is preferably used in an amount of 70 mass % or less, and more preferably 60 mass % or less, based on the total amount of the silane compounds used for the reaction.

When effecting hydrolysis and condensation, water is preferably used in an amount of 0.5 to 100 mol, and more preferably 1 to 30 mol, based on 1 mol of the silane compound (total amount).

Examples of the catalyst include an acid, an alkali metal compound, an organic base, a titanium compound, a zirconium compound, and the like. Specific examples of the acid include hydrochloric acid, sulfuric acid, nitric acid, oxalic acid, acetic acid, trifluoroacetic acid, phosphoric acid, and the like. Specific examples of the alkali metal compound include sodium hydroxide, potassium hydroxide, sodium methoxide, potassium methoxide, sodium ethoxide, and the like. Specific examples of the organic base include primary or secondary organic amines such as ethylamine, diethylamine, piperazine, piperidine, pyrrolidine, and pyrrole, tertiary organic amines such as triethylamine, tri-n-propylamine, tri-n-butylamine, pyridine, 4-dimethylaminopyridine, and diazabicycloundecene, quaternary organic amines such as tetramethylammonium hydroxide, and the like. The catalyst is preferably an alkali metal compound or an organic base, and particularly preferably an organic base since a side reaction (e.g., a ring-opening reaction of the epoxy group) can be suppressed, the rate of hydrolysis and condensation can be improved, and excellent storage stability is achieved, for example.

The amount of the organic base may be appropriately set depending on the type of the organic base, the reaction conditions (e.g., temperature), and the like. For example, the organic base is preferably used in an amount of 0.01 to 3-fold mol, and more preferably 0.05 to 1-fold mol, based on the silane compound (total amount).

Examples of the organic solvent that may be used when effecting hydrolysis and condensation include hydrocarbons, ketones, esters, ethers, alcohols, and the like. Specific examples of the hydrocarbons include toluene, xylene, and the like. Specific examples of the ketones include methyl ethyl ketone, methyl isobutyl ketone, methyl n-amyl ketone, diethyl ketone, cyclohexanone, and the like. Specific examples of the esters include ethyl acetate, n-butyl acetate, i-amyl acetate, propylene glycol monomethyl ether acetate, 3-methoxybutyl acetate, ethyl lactate, and the like. Specific examples of the ethers include ethylene glycol dimethyl ether, ethylene glycol diethyl ether, tetrahydrofuran, dioxane, and the like. Specific examples of the alcohols include 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether, and the like. It is preferable to use a water-insoluble organic solvent. These organic solvents may be used either alone or in combination.

When effecting hydrolysis and condensation, the organic solvent is preferably used in an amount of 10 to 10,000 parts by weight, and more preferably 50 to 1000 parts by weight, based on 100 parts by weight of the silane compound (total amount).

It is preferable to effect hydrolysis and condensation by dissolving the silane compound in the organic solvent, mixing the solution with the organic base and water, and heating the mixture using an oil bath or the like, for example. The heating temperature is preferably 130° C. or less, and more preferably 40 to 100° C. The heating time is preferably 0.5 to 12 hours, and more preferably 1 to 8 hours. The mixture may be stirred or refluxed during heating.

After completion of the reaction, the organic solvent layer preparatively isolated from the reaction mixture is preferably washed with water. It is preferable to wash the organic solvent layer using water including a small amount of a salt (e.g., an ammonium nitrate aqueous solution having a concentration of about 0.2 wt %) since the washing operation is facilitated. The organic solvent layer is washed until the aqueous layer after washing is neutral, and optionally dried using a desiccant (e.g., anhydrous calcium sulfate or molecular sieve), and the solvent is removed to obtained the target polyorganosiloxane.

Reaction of Epoxy Group-Containing Polyorganosiloxane with Carboxylic Acid that Includes Photoalignment Group The epoxy group-containing polyorganosiloxane may preferably be reacted with the carboxylic acid that includes a photoalignment group in the presence of a catalyst and an organic solvent.

The carboxylic acid that includes a photoalignment group may be used alone for the reaction with the epoxy group-containing polyorganosiloxane, or may be used for the reaction with the epoxy group-containing polyorganosiloxane in combination with an additional carboxylic acid. Examples of the additional carboxylic acid include formic acid, acetic acid, propionic acid, benzoic acid, methylbenzoic acid, a carboxylic acid that includes the group represented by the formula (A) (hereinafter may be referred to as "specific carboxylic acid"), and the like. When the specific carboxylic acid is used as the additional carboxylic acid, a polyorganosiloxane that includes a polymerizable carbon-carbon double bond in the side chain can be obtained.

A carboxylic acid that includes an acryloyl group or a methacryloyl group is preferable as the specific carboxylic acid. Specific examples of the specific carboxylic acid include the compounds respectively represented by the following formulas (C-1) to (C-3), and the like.

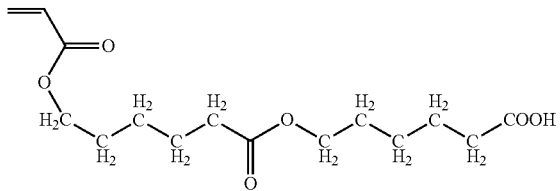
(C-1)

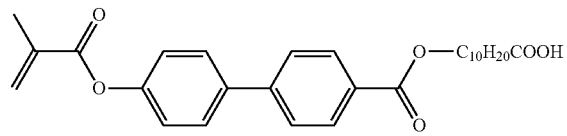
(C-2)

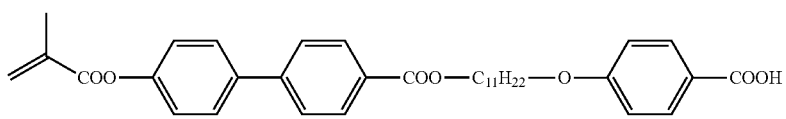
(C-3)

The carboxylic acid that includes a photoalignment group is preferably used in an amount of 5 mol % or more, and more preferably 10 mol % or more, based on the total amount of the carboxylic acids used for the reaction. The specific carboxylic acid is preferably used in an amount of 70 mol % or less, and more preferably 50 mol % or less, based on the total amount of the carboxylic acids used for the reaction.

The carboxylic acid is preferably used in a total amount of 0.001 to 10 mol, more preferably 0.01 to 5 mol, and still more preferably 0.05 to 2 mol, based on 1 mol of the epoxy groups included in the epoxy group-containing polyorganosiloxane.

Examples of the catalyst used for the reaction include an organic base, a compound known as a curing accelerator that accelerates the reaction of the epoxy compound, and the like.

Examples of the organic base include primary or secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; quaternary organic amines such as tetramethylammonium hydroxide; and the like. Examples of the curing accelerator include tertiary amines such as benzyldimethylamine and 2,4,6-tris(dimethylaminomethyl)phenol; imidazole compounds such as 2-methylimidazole and 2-n-heptylimidazole; organic phosphorus compounds such as diphenyl phosphine and triphenyl phosphine; quaternary phosphonium salts such as benzyltriphenylphosphonium chloride and tetra-n-butylphosphonium bromide; diazabicycloalkenes such as 1,8-diazabicyclo[5.4.0]undecene-7 and organic acid salts thereof; organic metal compounds such as zinc octylate, tin octylate, and an aluminum acetylacetone complex; quaternary ammonium salts such as tetraethylammonium bromide, tetra-n-butylammonium bromide, and tetraethylammonium chloride; boron compounds such as boron trifluoride and triphenyl borate; metal halogen compounds such as zinc chloride and stannic chloride; and the like. Among these, quaternary ammonium salts are preferable.

The catalyst is preferably used in an amount of 100 parts by weight or less, more preferably 0.01 to 100 parts by weight, and still more preferably 0.1 to 20 parts by weight, based on 100 parts by weight of the epoxy group-containing polyorganosiloxane.

Examples of the organic solvent used when reacting the epoxy group-containing polyorganosiloxane with the carboxylic acid include hydrocarbon compounds, ether compounds, ester compounds, ketone compounds, amide compounds, alcohol compounds, and the like. Among these, ether compounds, ester compounds, and ketone compounds are preferable from the viewpoint of the solubility of the raw material and the product and ease of purification of the product. Specific examples of a particularly preferable solvent include 2-butanone, 2-hexanone, methyl isobutyl ketone, butyl acetate, and the like. The organic solvent is preferably used so that the solid content (i.e., the ratio of the total weight of the components other than the solvent to the total weight of the solution) is 0.1 wt % or more, and more preferably 5 to 50 wt %. The reaction temperature is preferably 0 to 200° C., and more preferably 50 to 150° C. The reaction time is preferably 0.1 to 50 hours, and more preferably 0.5 to 20 hours.

The polystyrene-reduced weight average molecular weight of the polyorganosiloxane [a] determined by gel permeation chromatography is preferably 500 to 100,000, and more preferably 1000 to 50,000.

When the polyorganosiloxane [a] includes a polymerizable carbon-carbon double bond, the polyorganosiloxane [a] preferably includes a group that includes a polymerizable carbon-carbon double bond, preferably the group represented by the formula (A), and more preferably one or more groups selected from the above specific groups in an amount of 0.01 to 0.60 mol, more preferably 0.02 to 0.50 mol, and still more preferably 0.02 to 0.30 mol, based on 1 mol of the silicon atoms included in the polyorganosiloxane [a].

Polyamic Acid that Includes Photoalignment Group

A polyamic acid that includes a photoalignment group (hereinafter may be referred to as "polyamic acid [a]") may be produced as the polymer [a] by (i) reacting a tetracarboxylic dianhydride that includes a photoalignment group with a diamine, or (ii) reacting a tetracarboxylic dianhydride with a diamine that includes a photoalignment group, for example. It is preferable to use the method (ii) taking account of ease of introduction of a photoalignment group into the polyamic acid skeleton.

Tetracarboxylic Dianhydride

Examples of the tetracarboxylic dianhydride that is reacted with thediamine that includes a photoalignment group include aliphatic tetracarboxylic dianhydrides, alicyclic tetracarboxylic dianhydrides, aromatic tetracarboxylic dianhydrides, and the like. Specific examples of the aliphatic tetracarboxylic dianhydrides include 1,2,3,4-butanetetracarboxylic dianhydride and the like. Specific examples of the alicyclic tetracarboxylic dianhydrides include 2,3,5-tricarboxycyclopentylacetic dianhydride, cyclobutanetetracarboxylic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 3-oxabicyclo[3.2.1]octane-2,4-dione-6-spiro-3'-(tetrahydrofuran-2',5'-dione), 5-(2,5-dioxotetrahydro-3-furanyl)-3-methyl-3-cyclohexene-1,2-dicarboxylic anhydride 3,5,6-tricarboxy-2-carboxymethylnorbornane-2:3,5:6-dianhydride, 2,4,6,8-tetracarboxybicyclo[3.3.0]octane-2:4,6:8-dianhydride, 4,9-dioxatricyclo[5.3.1.0$^{2,6}$]undecane-3,5,8,10-tetraone, cyclohexanetetracarboxylic dianhydride, bicyclo[2.2.2]oct-7-ene-2,3,5,6-tetracarboxylic dianhydride, and the like. Specific examples of the aromatic tetracarboxylic dianhydrides include pyromellitic dianhydride and the like. The tetracarboxylic dianhydrides disclosed in Japanese Patent Application Publication (KOKAI) No. 2010-97188 may also be used. These tetracarboxylic dianhydrides may be used either alone or in combination.

Diamine

The diamine that includes a photoalignment group may be an aliphatic diamine, an alicyclic diamine, an aromatic diamine, a diaminoorganosiloxane, or the like. The photoalignment group included in the diamine is preferably the group represented by the formula (A), and more preferably a cinnamic acid structure-containing group. Specific examples of the diamine include the diamine represented by the following formula (d-1), the diamine represented by the following formula (d-2), and the like.

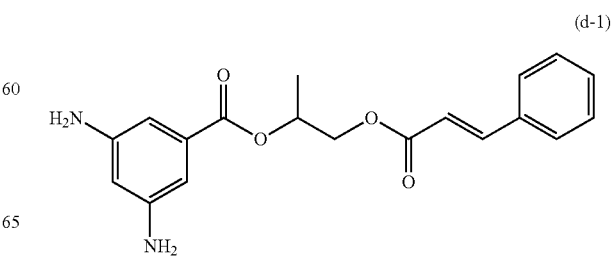

(d-1)

-continued

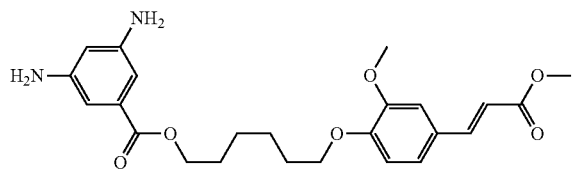
(d-2)

An additional diamine other than the diamine that includes a photoalignment group may also be used when synthesizing the polyamic acid. Examples of the additional diamine include m-xylylenediamine, tetramethylenediamine, 1,4-diaminocyclohexane, p-phenylenediamine, 4,4'-diaminodiphenylmethane, 4-aminophenyl-4'-aminobenzoate, 2,2'-dimethyl-4,4'-diaminobiphenyl, 4,4'-diaminodiphenyl ether, 2,2-bis[4-(4-aminophenoxy)phenyl] propane, 1,4-bis(4-aminophenoxy)benzene, 2,6-diaminopyridine, N,N'-bis(4-aminophenyl)benzidine, 3,5-diaminobenzoic acid, cholestanyl 3,5-diaminobenzoate, 1,1-bis(4-((aminophenyl)methyl)phenyl)-4-heptylcyclohexane, 4-aminobenzyl amine, a compound represented by the following formula (F-1), and the diamines disclosed in Japanese Patent Application Publication (KOKAI) No. 2010-97188. These additional diamines may be used either alone or in combination.

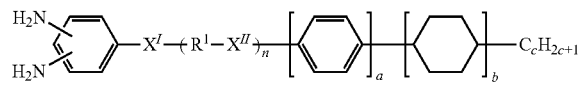
(F-1)

wherein $X^I$ and $X^{II}$ are independently a single bond, —O—, —COO—, or —OCO—, $R^I$ is an alkanediyl group having 1 to 3 carbon atoms, a is 0 or 1, b is an integer from 0 to 2, c is an integer from 1 to 20, and n is 0 or 1, provided that a case where a=b=0 is excluded.

Synthesis of Polyamic Acid

The tetracarboxylic dianhydride and the diamine used to synthesize the polyamic acid are preferably used so that the amount of the acid anhydride groups included in the tetracarboxylic dianhydride is 0.2 to 2 equivalents, and more preferably 0.3 to 1.2 equivalents, based on 1 equivalent of the amino groups included in the diamine.

The polyamic acid is preferably synthesized in an organic solvent at −20 to 150° C. (more preferably 0 to 100° C.) for 0.5 to 24 hours (more preferably 2 to 10 hours).

The organic solvent is not particularly limited as long as the organic solvent can dissolve the synthesized polyamic acid. Examples of the organic solvent include aprotic polar solvents such as N-methyl-2-pyrrolidone, N,N-dimethylacetamide, N,N-dimethylformamide, N,N-dimethylimidazolidinone, dimethyl sulfoxide, γ-butyrolactone, tetramethylurea, and hexamethylphosphortriamide; phenol-based solvents such as m-cresol, xylenol, phenol, and a halogenated phenol; and the like. An alcohol, a ketone, an ester, an ether, a halogenated hydrocarbon, a hydrocarbon, or the like may be used in combination with the above compounds.

The amount (a) of the organic solvent is preferably adjusted so that the total amount (b) of the tetracarboxylic dianhydride and the diamine is 0.1 to 50 mass %, and more preferably 5 to 30 mass %, based on the total amount (a+b) of the reaction solution.

A reaction solution in which the polyamic acid is dissolved is thus obtained. The reaction solution may be used directly to prepare the liquid crystal aligning agent, or the polyamic acid isolated from the reaction solution may be used to prepare the liquid crystal aligning agent, or the polyamic acid isolated from the reaction solution and then purified may be used to prepare the liquid crystal aligning agent. The polyamic acid may be isolated using a method that pours the reaction solution into a large quantity of a poor solvent to obtain a precipitate, and dries the precipitate under reduced pressure, or a method that evaporates the organic solvent included in the reaction solution under reduced pressure using an evaporator, for example. The polyamic acid may be purified using a method that dissolves the polyamic acid in an organic solvent, and precipitates the polyamic acid using a poor solvent, or a method that effects evaporation under reduced pressure using an evaporator once or several times, for example.

Synthesis of Polyimide that Includes a Photoalignment Group

The polyimide that includes a photoalignment group may be obtained by subjecting the amic acid structure of the polyamic acid synthesized as described above to a dehydration/ring-closing reaction. The polyimide may be a completely imidized product obtained by subjecting all of the amic acid structures of the polyamic acid to a dehydration/ring-closing reaction, or may be a partially imidized product obtained by subjecting only some of the amic acid structures of the polyamic acid to a dehydration/ring-closing reaction, thereby including both an amic acid structure and an imide structure. The polyamic acid may be subjected to a dehydration/ring-closing reaction by (i) heating the polyamic acid, or (ii) dissolving the polyamic acid in an organic solvent, and adding a dehydrating agent and a dehydration/ring-closing catalyst to the solution, followed by optional heating.

When subjecting the polyamic acid that includes a photoalignment group to a dehydration/ring-closing reaction to produce a polyimide, the reaction solution that includes the polyamic acid may be subjected directly to a dehydration/ring-closing reaction, or the polyamic acid isolated from the reaction solution may be subjected to a dehydration/ring-closing reaction, or the polyamic acid isolated from the reaction solution and then purified may be subjected to a dehydration/ring-closing reaction.

Examples of the dehydrating agent added to the solution of the polyamic acid include acid anhydrides such as acetic anhydride, propionic anhydride, and trifluoroacetic anhydride. The dehydrating agent is preferably used in an amount of 0.01 to 20 mol based on 1 mol of the amic acid structures included in the polyamic acid. Examples of the dehydration/ring-closing catalyst include tertiary amines such as pyridine, collidine, lutidine, and triethylamine. The dehydration/ring-closing catalyst is preferably used in an amount of 0.01 to 10 mol based on 1 mol of the dehydrating agent. Examples of the organic solvent used for the dehydration/ring-closing reaction include those mentioned above in connection with the organic solvent used when synthesizing the polyamic acid. The dehydration/ring-closing reaction temperature is preferably 0 to 180° C., and more preferably 10 to 150° C. The dehydration/ring-closing reaction time is preferably 1.0 to 120 hours, and more preferably 2.0 to 30 hours.

A reaction solution in which the polyimide is dissolved is thus obtained. The reaction solution may be used directly to prepare the liquid crystal aligning agent, or the polyimide isolated from the reaction solution may be used to prepare the liquid crystal aligning agent, or the polyimide isolated from the reaction solution and then purified may be used to prepare the liquid crystal aligning agent.

When the main-chain skeleton of the polymer [a] is a polyamic acid skeleton or a polyimide skeleton, the polystyrene-reduced weight average molecular weight of the polymer [a] determined by gel permeation chromatography is preferably 500 to 500,000, and more preferably 1000 to 100,000.

Polymer [b]

Examples of the main skeleton of the polymer that includes a photoalignment group in the main chain (polymer [b]) include a polyorganosiloxane, a polyamic acid, a polyimide, a polyamic ester, a polyester, a polyamide, a polysiloxane, a cellulose derivative, a polyacetal, a polystyrene derivative, a poly(styrene-phenylmaleimide) derivative, a poly(meth)acrylate, a reaction product of a polyfunctional carboxylic acid and a polyfunctional epoxy compound, and the like. Among these, a reaction product of a polyfunctional carboxylic acid and a polyfunctional epoxy compound is preferable.

The reaction product of a polyfunctional carboxylic acid and a polyfunctional epoxy compound is not particularly limited, but preferably includes a structure represented by the following formula (1). When the polymer [b] includes the above specific structure, it is possible to achieve more excellent liquid crystal alignment properties, and further suppress a deterioration in electrical properties due to continuous drive for a long time when the liquid crystal aligning agent is applied to an in-plane switching liquid crystal display, for example.

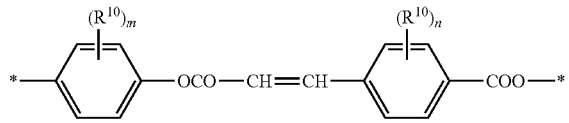

(1)

wherein $R^{10}$ is an alkyl group having 1 to 4 carbon atoms, a hydroxyl group, a halogen atom, or a cyano group, m and n are independently an integer from 0 to 4, provided that a plurality of $R^{10}$ are either identical or different when the sum of m and n is equal to or larger than 2, and * is a bonding site.

The polymer that includes the structure represented by the formula (1) in the main chain may be produced by an arbitrary method. It is preferable that the polymer that includes the structure represented by the formula (1) in the main chain be a reaction product of a polyfunctional epoxy compound and a polyfunctional carboxylic acid that includes the structure represented by the formula (1) due to simplicity of the production method and ease of isolation and purification of the polymer.

Examples of the polyfunctional epoxy compound used for the synthesis of the polymer that includes the structure represented by the formula (1) in the main chain include diepoxy compounds and the like. Specific examples of the polyfunctional epoxy compound include 1,2,3,4-diepoxybutane, 1,2,4,5-diepoxypentane, 2-methyl-1,2,3,4-diepoxybutane, 1,2,5,6-diepoxyhexane, ethylene glycol diglycidyl ether, diethylene glycol diglycidyl ether, and the like.

The polyfunctional epoxy compound and the polyfunctional carboxylic acid that includes the structure represented by the formula (1) may be reacted in an appropriate organic solvent, for example. The reaction temperature is preferably 0 to 250° C., and more preferably 50 to 200° C. The reaction time is preferably 1 to 120 hours, and more preferably 2 to 30 hours.

The polystyrene-reduced weight average molecular weight of the polymer [b] determined by gel permeation chromatography is preferably 500 to 500,000, and more preferably 1000 to 100,000.

Polymer [c]

The polymer [c] may be used as the polymer that includes a photoalignment structure that is included in the liquid crystal aligning agent [B]. The structure of the polymer [c] is not particularly limited as long as the polymer [c] has photodecomposition alignment properties. The polymer [c] is preferably selected from the group consisting of a polyamic acid and a polyimide (hereinafter may be referred to as "polyamic acid and/or polyimide [c]").

A known polymer may be used as the polyamic acid and/or polyimide [c]. It is preferable to use a polymer that includes a bicyclo[2.2.2]octene skeleton or a cyclobutane skeleton. When the polyamic acid and/or polyimide [c] includes the above specific structure, it is possible to achieve more excellent liquid crystal alignment properties, and further suppress a deterioration in electrical properties due to continuous drive for a long time when producing a liquid crystal display using the liquid crystal aligning agent according to one embodiment of the invention. It is preferable that the polyamic acid include one of structural units respectively represented by the following formulas (c-1) to (c-4), and the polyimide include a structural unit represented by the following formula (c-5) or (c-6).

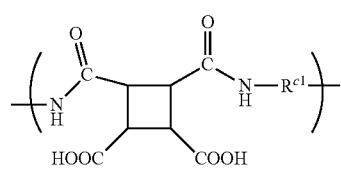

(c-1)

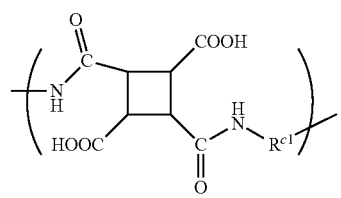

(c-2)

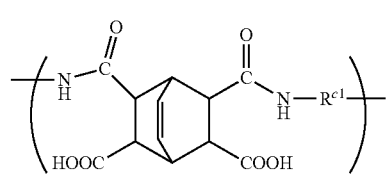

(c-3)

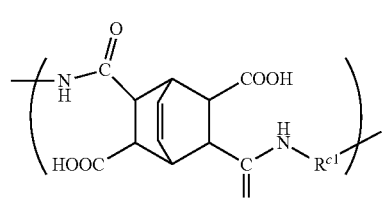

(c-4)

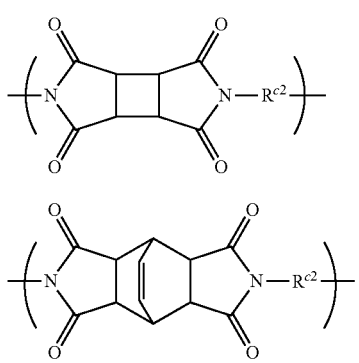

wherein R is a hydrogen atom or a methyl group, and $Y^2$ and $Y^3$ are independently an oxygen atom or a sulfur atom.

The number of monovalent groups represented by the formula (B-II) included in the compound (B-1) is preferably 2 to 6, and more preferably 2. $Y^2$ is preferably an oxygen atom.

It is preferable that the compound (B-1) further include at least one divalent group represented by the following formula (B-I) in the molecule.

wherein $X^1$ and $X^2$ are independently a 1,4-phenylene group, a 1,4-cyclohexylene group, a 1,4-phenylene group, or a group obtained by substituting at least one of the hydrogen atoms of a 1,4-cyclohexylene group with an alkyl group having 1 to 4 carbon atoms, an alkoxy group having 1 to 4 carbon atoms, a fluorine atom, or a cyano group, and $Y^1$ is a single bond, a divalent hydrocarbon group having 1 to 4 carbon atoms, an oxygen atom, a sulfur atom, or —COO—.

Examples of the divalent hydrocarbon group having 1 to 4 carbon atoms represented by $Y^1$ in the formula (B-I) include a methylene group, a dimethylmethylene group, and the like. Specific examples of the divalent group represented by the formula (B-I) include the groups respectively represented by the following formulas (B-1) to (B-1-6), groups obtained by substituting a hydrogen atom among the hydrogen atoms of the benzene ring or the cyclohexane ring in the formulas (B-1) to (B-1-6) with an alkyl group having 1 to 4 carbon atoms, an alkoxy group having 1 to 4 carbon atoms, a fluorine atom, or a cyano group, and the like.

wherein $R^{c1}$ and $R^{c2}$ are independently a divalent organic group.

Examples of the divalent organic group represented by $R^{c1}$ and $R^{c2}$ include an alkanediyl group having 1 to 30 carbon atoms, a divalent alicyclic hydrocarbon group having 3 to 40 carbon atoms, a divalent aromatic hydrocarbon group having 5 to 40 carbon atoms, and the like.

A polyamic acid or a polyimide that includes a bicyclo[2.2.2]octene skeleton or a cyclobutane skeleton may be obtained by reacting a tetracarboxylic dianhydride including at least one of a cyclobutanetetracarboxylic dianhydride and a bicyclo[2.2.2]oct-7-ene-2,3,5,6-tetracarboxylic dianhydride with a diamine used as the additional diamine, for example. The above reaction may be effected in the same manner as described above in connection with the polyamic acid or the polyimide that includes a photoalignment group.

The polystyrene-reduced weight average molecular weight of the polymer [c] determined by gel permeation chromatography is preferably 500 to 500,000, and more preferably 1000 to 100,000.

The specific polymer is preferably used in a ratio of 0.5 wt % or more, and more preferably 2 wt % or more, based on the total amount of the liquid crystal aligning agent. Note that the polymers [a], the polymers [b], or the polymers [c] may be used as the specific polymer either alone or in combination.

It is preferable that the specific polymer included in the liquid crystal aligning agent according to one embodiment of the invention include at least one polymer selected from the group consisting of the polyorganosiloxane [a] and the polymer [b], and more preferably the polyorganosiloxane [a].

Component that Includes Polymerizable Carbon-Carbon Double Bond

The component that includes a polymerizable carbon-carbon double bond is a compound that is included in the liquid crystal aligning agents [B] and [C], and may be a polymer or a monomer. When the component that includes a polymerizable carbon-carbon double bond is a polymer, the polystyrene-reduced weight average molecular weight of the component that includes a polymerizable carbon-carbon double bond determined by gel permeation chromatography is preferably 200 to 50,000, and more preferably 500 to 10,000.

Examples of the component that includes a polymerizable carbon-carbon double bond include a compound (B-1) that includes at least two monovalent groups represented by the following formula (B-II) in the molecule, and the like.

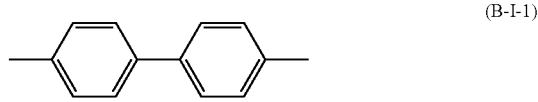

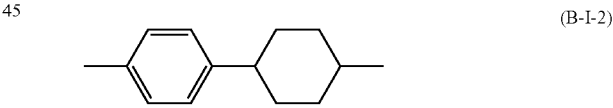

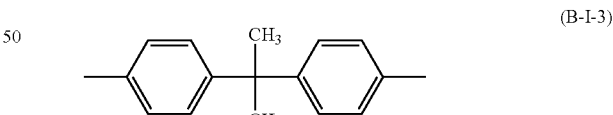

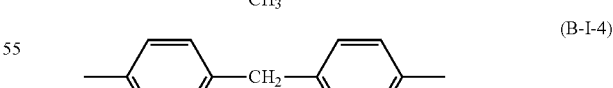

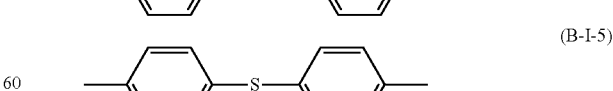

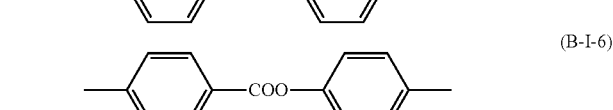

Specific examples of the compound (B-1) include a di(meth)acrylate that includes a biphenyl structure (i.e., the divalent group represented by the formula (B-I) is the group represented by the formula (B-1), and $Y^2$ and $Y^3$ in the formula (B-II) are oxygen atoms), a di(meth)acrylate that includes a phenyl-cyclohexyl structure (i.e., the divalent group represented by the formula (B-I) is the group represented by the formula (B-2), and $Y^2$ and $Y^3$ in the formula (B-II) are oxygen atoms), a di(meth)acrylate that includes a 2,2-diphenylpropane structure (i.e., the divalent group represented by the formula (B-I) is the group represented by the formula (B-3), and $Y^2$ and $Y^3$ in the formula (B-II) are oxygen atoms), a di(meth)acrylate that includes a diphenylmethane structure (i.e., the divalent group represented by the formula (B-I) is the group represented by the formula (B-4), and $Y^2$ and $Y^3$ in the formula (B-II) are oxygen atoms), a dithio(meth)acrylate that includes a diphenyl thioether structure (i.e., the divalent group represented by the formula (B-I) is the group represented by the formula (B-5), $Y^2$ in the formula (B-II) is an oxygen atom, and $Y^3$ in the formula (B-II) is a sulfur atom), and the like.

Further examples of the component that includes a polymerizable carbon-carbon double bond include monomer compounds such as (meth)acrylate monomers including dipentaerythritol hexaacrylate, pentaerythritol ethoxytetraacrylate, and pentaerythritol triacylate; acrylic-based polymers that include a (meth)acryloyl group or the like; siloxane-based polymers such as a silsesquioxane that include a (meth)acryloyl group or the like; and the like. Among these, acrylic-based or siloxane-based polymers that include a (meth)acryloyl group or the like are preferable, and siloxane-based polymers that include a (meth)acryloyl group are more preferable.

When the liquid crystal aligning agent according to one embodiment of the invention includes the component that includes a polymerizable carbon-carbon double bond, the component that includes a polymerizable carbon-carbon double bond is preferably used in an amount of 0.1 to 70 parts by mass, more preferably 0.5 to 60 parts by mass, and still more preferably 1 to 50 parts by mass, based on 100 parts by mass (solid basis) of the polymers included in the liquid crystal aligning agent in total.

Additional Component

The liquid crystal aligning agents [A], [B], and [C] may optionally include an additional component. Examples of the additional component include a polymer other than the specific polymer (hereinafter may be referred to as "additional polymer"), a curing agent, a curing catalyst, a curing acceleratora compound that includes at least one epoxy group in the molecule (that excludes the polyorganosiloxane [a]) (hereinafter may be referred to as "epoxy compound"), a functional silane compound (that excludes the polyorganosiloxane [a]), a surfactant, and the like. Each component is described in detail below.

Additional Polymer

The additional polymer may be used to further improve the solution properties and the electrical properties of the liquid crystal aligning agent. Examples of a preferable additional polymer include a polymer other than the specific polymer (hereinafter may be referred to as "polymer [D]"), and a polyorganosiloxane other than the polyorganosiloxane [a](hereinafter may be referred to as "additional polyorganosiloxane"). Further examples of the additional polymer include polyamic esters, polyester, polyamides, cellulose derivatives, polyacetals, polystyrene derivatives, poly(styrene-phenylmaleimide) derivatives, poly(meth)acrylates, and the like.

The polymer [D] may be obtained by reacting the tetracarboxylic dianhydride mentioned above in connection with the synthesis of the polyamic acid that includes a photoalignment group with the additional diamine, for example. When the liquid crystal aligning agent further includes the polymer [D], it is possible to more effectively suppress a deterioration in electrical properties due to continuous drive for a long time. In particular, the above effect can be easily obtained when the liquid crystal aligning agent that includes the polyorganosiloxane [a] as the specific polymer further includes the polymer [D]. The polymer [D] is preferably used in an amount of 5 to 2000 parts by mass, and more preferably 10 to 1000 parts by mass, based on 100 parts by mass (solid basis) of the polyorganosiloxane [a].

The additional polyorganosiloxane may be synthesized by subjecting at least one silane compound selected from the group consisting of an alkoxysilane compound and a halogenated silane compound (hereinafter may be referred to as "raw material silane compound") to hydrolysis and condensation preferably in an appropriate organic solvent in the presence of water and a catalyst, for example.

The additional polymer is preferably added to the liquid crystal aligning agent in a ratio (total amount) of 85 wt % or less, and more preferably 0.1 to 80 wt %, based on the total amount of the polymers included in the liquid crystal aligning agent.

Curing Agent, Curing Catalyst, and Curing Accelerator

The curing agent may be a curing agent that is normally used for curing a curable compound that includes an epoxy group, or a curable composition that includes compound that includes an epoxy group. Examples of the curing agent include polyamines, polycarboxylic anhydrides, and polycarboxylic acids. An antimony hexafluoride compound, a phosphorus hexafluoride compound, aluminum trisacetylacetonate, or the like may be used as the curing catalyst. Examples of the curing accelerator include the compounds mentioned above as the curing accelerator (catalyst) used for the reaction of the epoxy group-containing polyorganosiloxane and the carboxylic acid, and the like.

The curing agent or the like is preferably added to the liquid crystal aligning agent in a ratio (total amount) of 40 wt % or less, and more preferably 0.1 to 30 wt %, based on the total amount of the polymers included in the liquid crystal aligning agent.

Epoxy Compound

The epoxy compound may be added to the liquid crystal aligning agent according to one embodiment of the invention in order to improve adhesion of the resulting liquid crystal alignment film to the surface of a substrate. Examples of a preferable epoxy compound include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromoneopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, N,N-diglycidylbenzylamine, N,N-diglycidylaminomethylcyclohexane, and the like.

The epoxy compound is preferably added to the liquid crystal aligning agent in an amount of 40 parts by weight or less, and more preferably 0.1 to 30 parts by weight, based on 100 parts by weight (total amount) of the polymers included in the liquid crystal aligning agent.

Functional Silane Compound

The functional silane compound may be used to improve adhesion of the resulting liquid crystal alignment film to the surface of a substrate. Examples of the functional silane compound include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-triethoxysilylpropyltriethylenetriamine, 10-trimethoxysilyl-1,4,7-triazadecane, 9-trimethoxysilyl-3,6-diazanonyl acetate, N-benzyl-3-aminopropyltrimethoxysilane, N-phenyl-3-aminopropyltrimethoxysilane, N-bis(oxyethylene)-3-aminopropyltrimethoxysilane, 3-glycidyloxypropyltrimethoxysilane, 2-(3,4-epoxycyclohexyl)ethyltrimethoxysilane, and the like. A reaction product of a tetracarboxylic dianhydride and an amino group-containing silane compound (see Japanese Patent Application Publication (KOKAI) No. 63-291922) and the like may also be used.

The functional silane compound is preferably added to the liquid crystal aligning agent in an amount of 2 parts by weight or less, and more preferably 0.02 to 0.2 parts by weight, based on 100 parts by weight (total amount) of the polymers included in the liquid crystal aligning agent.

Photoinitiator

The liquid crystal aligning agent according to one embodiment of the invention may include a photoinitiator. Examples of the photoinitiator include α-diketones, acyloins, acyloin ethers, benzophenone compounds, acetophenone compounds, quinone compounds, halogen compounds, acylphosphine oxides, organic peroxides, and the like. Specific examples of the α-diketones include benzyl, diacetyl, and the like. Specific examples of the acyloins include benzoin and the like. Specific examples of the acyloin ethers include benzoin methyl ether, benzoin ethyl ether, benzoin isopropyl ether, and the like. Specific examples of the benzophenone compounds include thioxanthone, 2,4-diethylthioxanthone, thioxanthone-4-sulfonic acid, benzophenone, and the like. Specific examples of the acetophenone compounds include acetophenone, p-dimethylaminoacetophenone, 4-(α,α'-dimethoxyacetoxy)benzophenone, and the like. Specific examples of the quinone compounds include anthraquinone, 1,4-naphthoquinone, and the like. Specific examples of the halogen compounds include phenacyl chloride, tribromomethylphenylsulfone, tris(trichloromethyl)-s-triazine, and the like. Specific examples of the acylphosphine oxides include 2,4,6-trimethylbenzoyldiphenylphosphine oxide, bis(2,6-dimethoxybenzoyl)-2,4,4-trimethylpentylphosphine oxide, and the like. Specific examples of the organic peroxides include di-t-butyl peroxide and the like. Examples of a commercially available product of the photoinitiator include the IRGACURE series and the Darocur series (manufactured by Ciba Specialty Chemicals Co., Ltd.); the KAYA-CURE series (manufactured by Nippon Kayaku Co., Ltd.); and the like. These photoinitiators may be used either alone or in combination. It is preferable to use a benzophenone compound as the photoinitiator due to high thermal stability.

The photoinitiator is preferably added to the liquid crystal aligning agent in an amount of 30 parts by weight or less, and more preferably 0.5 to 30 parts by weight, based on 100 parts by weight (total amount) of the polymers that include a polymerizable carbon-carbon double bond.

Radical Scavenger

A radical scavenger may be added to the liquid crystal aligning agent in order to prevent a situation in which a polymerizable carbon-carbon double bond undergoes an undesirable reaction when heating the liquid crystal aligning agent applied to the substrate to form a film.

Specific examples of the radical scavenger include pentaerythritoltetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N'-hexane-1,6-diylbis[3-(3,5-di-tert-butyl-4-hydroxyphenylpropionamide), 3,3',",5',5"-hexa-tert-butyl-α,α',α"-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate, hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamine)phenol, and the like. One or more compounds selected from these compounds may be used as the radical scavenger. A commercially available product may be used as the radical scavenger, for example.

The radical scavenger is preferably added to the liquid crystal aligning agent in an amount of 10 parts by mass or less, and more preferably 0.1 to 5 parts by mass, based on 100 parts by mass (total amount) of the polymers that include a polymerizable carbon-carbon double bond.

Solvent

The liquid crystal aligning agent according to one embodiment of the invention is preferably prepared in the form of a liquid composition in which each component is dispersed or dissolved in an organic solvent. The organic solvent that may be used to prepare the liquid crystal aligning agent according to one embodiment of the invention is preferably a compound that dissolved the polymer and an additional component included in the liquid crystal aligning agents [A] to [C], but does not react with the polymer and an additional component included in the liquid crystal aligning agents [A] to [C]. The organic solvent is preferably a compound that ensures that each component included in the liquid crystal aligning agent does not precipitate at the following preferable solid content, and the surface tension of the liquid crystal aligning agent is within the range of 25 to 40 mN/m.

The organic solvent that may preferably be used for the liquid crystal aligning agent according to one embodiment of the invention differs depending on the type of polymer. When the liquid crystal aligning agent according to one embodiment of the inventions includes the polyorganosiloxane and at least one of the polyamic acid and the polyimide, the organic solvents mentioned above in connection with the synthesis of the polyamic acid may be used. In this case, a poor solvent for the polyamic acid may be used in combination with the organic solvent. These organic solvents may be used either alone or in combination.

Examples of a preferable organic solvent used when the liquid crystal aligning agent according to one embodiment of the invention includes only the polyorganosiloxane as the polymer include 1-ethoxy-2-propanol, propylene glycol monoethyl ether, propylene glycol monopropyl ether, propylene glycol monobutyl ether, propylene glycol monoacetate, dipropylene glycol methyl ether, dipropylene glycol ethyl ether, dipropylene glycol propyl ether, dipropylene glycol dimethyl ether, ethylene glycol monomethyl ether, ethylene glycol monoethyl ether, ethylene glycol monopropyl ether, ethylene glycol monobutyl ether (butyl cellosolve), ethylene glycol monoamyl ether, ethylene glycol monohexyl ether, diethylene glycol, methyl cellosolve acetate, ethyl cellosolve acetate, propyl cellosolve acetate, butyl cellosolve acetate, methyl carbitol, ethyl carbitol, propyl carbitol, butyl carbitol, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, n-hexyl acetate, cyclohexyl acetate, octyl acetate, amyl acetate, isoamyl acetate, and the like. Among these, n-propyl acetate, i-propyl acetate, n-butyl acetate, i-butyl acetate, sec-butyl acetate, n-pentyl acetate, sec-pentyl acetate, and the like are preferable.

The solid content (i.e., the ratio of the total mass of the components other than the solvent to the total mass of the liquid crystal aligning agent) in the liquid crystal aligning agent according to one embodiment of the invention is appropriately selected taking account of the viscosity, the volatility, and the like of the liquid crystal aligning agent, but is preferably 1 to 10 mass %. The liquid crystal aligning agent according to one embodiment of the invention is applied to the surface of a substrate to form a film (liquid crystal alignment film). If the solid content is less than 1 mass %, the resulting film may have too small a thickness, and a good liquid crystal alignment film may not be obtained. If the solid content exceeds 10 mass %, the resulting film may have too large a thickness, and a good liquid crystal alignment film may not be obtained. Moreover, the liquid crystal aligning agent may exhibit insufficient applicability due to an increase in viscosity. A particularly preferable solid content range differs depending on the method used when applying the liquid crystal aligning agent to the substrate. For example, when applying the liquid crystal aligning agent to the substrate using a spinner method, it is particularly preferable to adjust the solid content to 1.5 to 4.5 mass %. When applying the liquid crystal aligning agent to the substrate using a printing method, it is particularly preferable to adjust the solid content to 3 to 9 mass % so that the viscosity of the solution is 12 to 50 mPa·s. When applying the liquid crystal aligning agent to the substrate using an inkjet method, it is particularly preferable to adjust the solid content to 1 to 5 mass % so that the viscosity of the solution is 3 to 15 mPa·s.

The liquid crystal aligning agent according to one embodiment of the invention is preferably prepared at 0 to 200° C., and more preferably 0 to 40° C.

Liquid Crystal Alignment Film and Liquid Crystal Display

A liquid crystal alignment film according to one embodiment of the invention is formed by the photoalignment method using the liquid crystal aligning agent, for example. The advantageous effects of the invention can be maximized when the liquid crystal alignment film according to one embodiment of the invention is applied to an in-plane switching liquid crystal display, for example. A liquid crystal display according to one embodiment of the invention includes a liquid crystal alignment film that is formed using the liquid crystal aligning agent. A method for producing a liquid crystal display according to one embodiment of the invention is described below. The liquid crystal alignment film and the crystal display according to the embodiments of the invention are also described in detail below.

Step 1: Formation of Film

In a step 1, the liquid crystal aligning agent according to one embodiment of the invention is applied to a substrate, and heated (i.e., the surface of the substrate to which the liquid crystal aligning agent is applied is heated) to form a film on the substrate.

When applying the liquid crystal aligning agent according to one embodiment of the invention to a liquid crystal display that includes an in-plane switching-mode liquid crystal cell, a substrate (first substrate) on which a pair of electrodes are formed (one side) by a conductive film (transparent conductive film or metal film) that is patterned in a comb-like configuration, and a common substrate (second substrate) are provided, and the liquid crystal aligning agent according to one embodiment of the invention is applied to the side of the first substrate on which the comb-like electrodes are formed, and one side of the second substrate to form a film. When producing an in-plane switching liquid crystal display, a substrate on which an electrode is not formed is normally used as the second substrate.

The substrate may be a transparent substrate formed of glass (e.g., float glass or soda glass) or a plastic (e.g., polyethylene terephthalate, polybutylene terephthalate, polyethersulfone, or polycarbonate). An ITO film (e.g., $In_2O_3$—$SnO_2$ film), a NESA ("NESA" is a registered trademark of PPG Industries (USA)) film formed of $SnO_2$, or the like may be used as the transparent conductive film. A film formed of a metal such as chromium may be used as the metal film. The transparent conductive film or the metal film may be patterned by patterning an unpatterned transparent conductive film by photoetching, sputtering, or the like, or may be patterned by utilizing a mask having a desired pattern when forming a transparent conductive film, for example.

Figure 2:
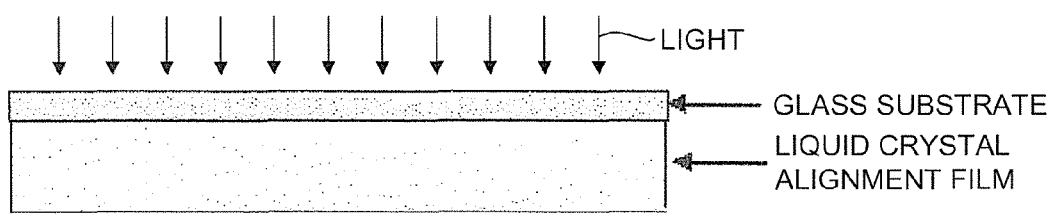
FIG. 2 is a cross-sectional view illustrating: the structure of an FFS-mode liquid crystal display, and a state in which the signal electrode and the common electrode thereof are not electrically connected and a voltage is not applied between the electrodes while light is applied to the liquid crystal cell to cure the polymerizable composition included in the liquid crystal alignment film.
Figure 2:
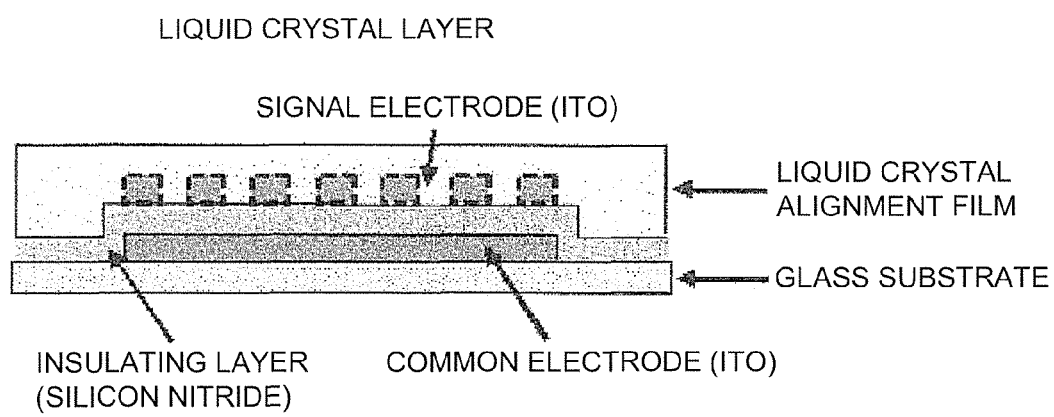
Figure 3:
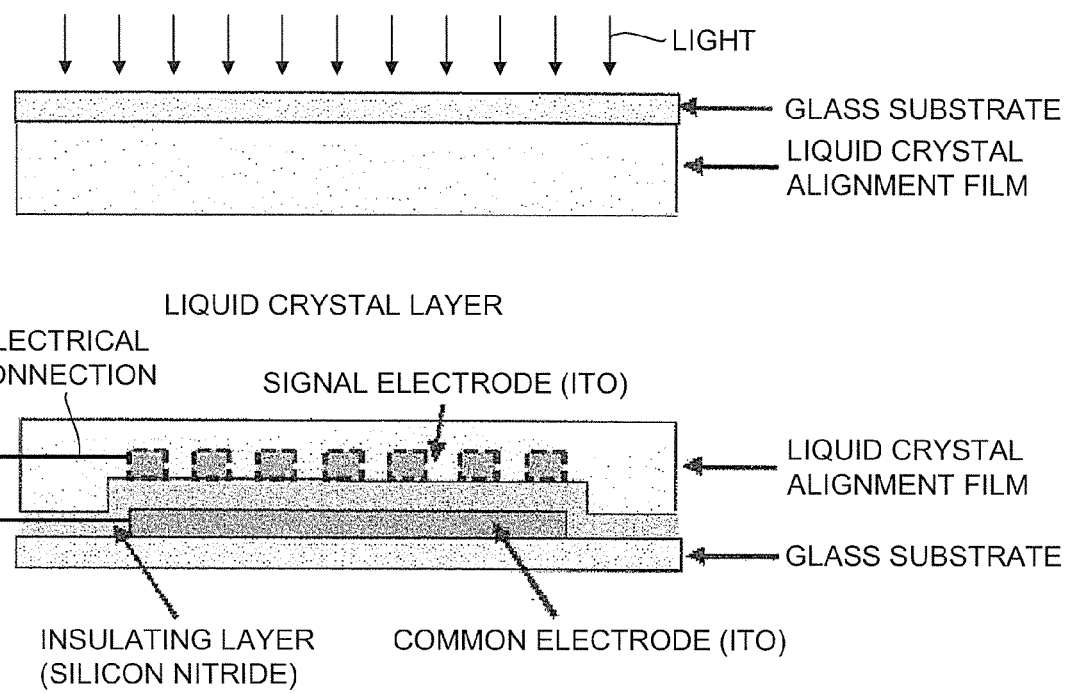
FIG. 3 is a cross-sectional view illustrating: the structure of an FFS-mode liquid crystal display, and a state in which the signal electrode and the common electrode thereof are electrically connected and a voltage is not applied between the electrodes while light is applied to the liquid crystal cell to cure the polymerizable composition included in the liquid crystal alignment film.

When producing an FFS-mode liquid crystal display, a common electrode, an insulating layer, a signal electrode, and a liquid crystal alignment film are sequentially formed on the side of one of the pair of substrates that is situated on the side of a liquid crystal layer (see FIG. 2). The common electrode may be a NESA film ("NESA" is a registered trademark of PPG Industries (USA)) formed of tin oxide ($SnO_2$), an ITO film formed of indium oxide-tin oxide ($In_2O_3$—$SnO_2$), or the like. The common electrode may be an unpatterned electrode formed over a specific area of the substrate, or may be an electrode having an arbitrary pattern. The thickness of the common electrode is preferably 10 to 200 nm, and more preferably 20 to 100 nm. The common electrode may be formed on the substrate using a known method (e.g., sputtering).

The insulating layer may be formed of silicon nitride, for example. The thickness of the insulating layer is preferably 100 to 1000 nm, and more preferably 150 to 750 nm. The insulating layer may be formed on the common electrode using a known method (e.g., chemical vapor deposition).

The signal electrode may be formed of the same material as that of the common electrode. The signal electrode is a comb-like electrode that includes a plurality of teeth, for example. The teeth of the comb-like electrode may have a linear shape, a bent shape, or the like.

A functional silane compound, a titanate, or the like may be applied to the substrate and the electrode before applying the liquid crystal aligning agent to the substrate in order to improve adhesion between the resulting film and the substrate, the conductive film, or the electrode. The liquid crystal aligning agent may be applied to the substrate using an appropriate coating method (preferably an offset printing method, a spin coating method, a roll coating method, or an inkjet printing method).

After applying the liquid crystal aligning agent, the liquid crystal aligning agent (the side of the substrate to which the liquid crystal aligning agent is applied) is prebaked, and then post-baked to form a film. The liquid crystal aligning agent is prebaked at 40 to 120° C. for 0.1 to 5 minutes, for example. The liquid crystal aligning agent is preferably post-baked at 120 to 300° C. (more preferably 150 to 250° C.) for 5 to 200 minutes (more preferably 10 to 100 minutes). The thickness of the film obtained by post-baking is preferably 0.001 to 1 μm, and more preferably 0.005 to 0.5 μm.

Light may be applied to the film formed on the substrate in order to provide the film with a liquid crystal alignment capability. In this case, linearly polarized radiation, partially polarized radiation, or unpolarized radiation is used. UV light or visible light including light having a wavelength of 150 to 800 nm may be used as the radiation. It is preferable to use UV light including light having a wavelength of 200 to 400 nm. When using linearly polarized radiation or partially polarized radiation, radiation may be applied in the direction normal (vertical) to the surface of the substrate, or may be applied diagonally to the surface of the substrate, or may be applied in the direction normal (vertical) to the surface of the substrate and diagonally to the surface of the substrate. When using unpolarized radiation, radiation is applied diagonally to the surface of the substrate.

A low-pressure mercury lamp, a high-pressure mercury lamp, a deuterium lamp, a metal halide lamp, an argon resonance lamp, a xenon lamp, an excimer laser, or the like may be used as a light source. UV light having the above preferable wavelength region may be obtained using the light source in combination with a filter, a diffraction grating, or the like, for example.

The dose is preferably 1 $J/m^2$ or more and less than 20,000 $J/m^2$, and more preferably 10 to 10,000 $J/m^2$. Note that it is preferable that the dose when applying radiation to the film formed on the substrate be lower than that when applying radiation from the outside of the liquid crystal cell (see below).

Step 2: Formation of Liquid Crystal Cell

Two substrates on which the film is formed as described above are provided, and a liquid crystal layer is placed between the substrates disposed opposite to each other to produce a liquid crystal cell in which a first substrate and a second substrate are disposed opposite to each other through the liquid crystal layer.

The liquid crystal cell may be produced using the following first or second method, for example. The first method is a known method. Specifically, the two substrates are disposed through a cell gap so that the liquid crystal alignment films face each other, and are bonded in the peripheral area using a sealant. After filling the cell gap defined by the surface of the substrate and the sealant with a polymerizable liquid crystal composition, the injection hole is sealed to produce a liquid crystal cell. The second method utilizes an one-drop-fill (ODF) technique. Specifically, a UV-curable sealant is applied to a given area of one of the two substrates on which the liquid crystal alignment film is formed, for example. After dropping a polymerizable liquid crystal composition onto the liquid crystal alignment film, the substrates are bonded so that the liquid crystal alignment films face each other, and the sealant is cured by applying UV light to the entire surface of the substrate to produce a liquid crystal cell. When using the first or second method, it is desirable to heat the liquid crystal cell up to a temperature at which the liquid crystal shows an isotropic phase, and gradually cool the liquid crystal cell to room temperature to remove the flow alignment of the liquid crystal that has occurred during filling.

An epoxy resin that aluminum oxide balls (i.e., spacer) and includes a curing agent may be used as the sealant, for example.

Examples of the liquid crystal include a nematic liquid crystal and a smectic liquid crystal. It is preferable to use a nematic liquid crystal. For example, a Schiff base-based liquid crystal, an azoxy-based liquid crystal, a biphenyl-based liquid crystal, a phenylcyclohexane-based liquid crystal, an ester-based liquid crystal, a terphenyl-based liquid crystal, a biphenylcyclohexane-based liquid crystal, a pyrimidine-based liquid crystal, a dioxane-based liquid crystal, a bicyclooctane-based liquid crystal, a cubane-based liquid crystal, or the like may be used. A cholesteric liquid crystal (e.g., cholestyl chloride, cholesteryl nonate, and cholesteryl carbonate), a chiral agent (e.g., "C-15" and "CB-15" manufactured by Merck), a ferroelectric liquid crystal (e.g., p-decyloxybenzilidene-p-amino-2-methylbutyl cinnamate), or the like may be added to the above liquid crystal.

The thickness of the liquid crystal molecule layer (i.e., the distance between the signal electrode and the common substrate) is preferably 3 to 10 μm.

Step 3: Irradiation

After forming the liquid crystal cell, light is applied to the liquid crystal cell in a state in which a specific voltage that does not drive the liquid crystal molecules included in the liquid crystal layer is applied between the pair of electrodes formed on the first substrate, or a voltage is not applied between the pair of electrodes. The polymerizable composition included in the liquid crystal alignment film is cured (polymerized) by thus applying light. In this case, linearly polarized radiation, partially polarized radiation, or unpolarized radiation is applied to the liquid crystal cell. UV light or visible light including light having a wavelength of 150 to 800 nm may be used as the radiation. It is preferable to use UV light including light having a wavelength of 200 to 400 nm. The irradiation direction may be the same as described above in connection with irradiation before forming the liquid crystal cell.

For example, when the liquid crystal aligning agent includes the polyorganosiloxane [a] or the polyamic acid [a], it is preferable to apply radiation having a wavelength of 300 to 400 nm. In this case, the dose is preferably 1 to 200,000 $J/m^2$, and more preferably 10 to 100,000 $J/m^2$. When the liquid crystal aligning agent includes the polymer [b], it is preferable to apply radiation having a wavelength of 300 to 400 nm. In this case, the dose is preferably 1 to 20,000 $J/m^2$, and more preferably 10 to 10,000 $J/m^2$. When the liquid crystal aligning agent includes the polyamic acid and/or polyimide [c], it is preferable to apply radiation having a wavelength of 200 to 400 nm. In this case, the dose is preferably 1 to 20,000 $J/m^2$, and more preferably 10 to 10,000 $J/m^2$.

A light source may be the same as those described above in connection with irradiation before forming the liquid crystal cell.

When producing an in-plane switching liquid crystal display, it is preferable to apply light in a state in which a voltage is not applied when polymerizing the monomer. It is more preferable to eliminate the effects of charge due to static electricity or the like through grounding, short-circuiting, or the like. A voltage may be applied when polymerizing the monomer.

Specifically, light may be applied to the liquid crystal cell in a state in which a voltage is not applied between the pair of electrodes formed on the first substrate. In this case, light may be applied to the liquid crystal cell in a state in which the pair of electrodes formed on the first substrate are not electrically connected, or in a state in which the pair of electrodes formed on the first substrate are electrically connected (i.e., the potential difference between the pair of electrodes is set to 0 (i.e., the pair of electrodes are short-circuited). When light is applied to the liquid crystal cell in a state in which the pair of electrodes are short-circuited, the effects of charge due to static electricity or the like can be eliminated or minimized. The effects of charge due to static electricity or the like may also be eliminated or minimized by applying light to the liquid crystal cell in a state in which a specific voltage that does not drive the liquid crystal molecules included in the liquid crystal layer is applied between the pair of electrodes formed on the first substrate. The specific voltage that does not drive the liquid crystal molecules may be appropriately set depending on the liquid crystal cell, but may be 0 to 1 V, and preferably 0 V, for example.

In order to further reduce the effects of charge due to static electricity or the like, electricity may be removed from the liquid crystal cell using a neutralization device before light is applied to the liquid crystal cell, or when light is applied to the liquid crystal cell (preferably before light is applied to the liquid crystal cell). A known device that removes charge may be used as the neutralization device. For example, an ionization-type neutralization device, a corona discharge-type neutralization device, or the like may be used. The neutralization time using the neutralization device may be appropriately set depending on the neutralization device. For example, the neutralization time may be several seconds to several minutes.

It is conjectured that the alignment properties of the liquid crystal molecules situated at the boundary between the liquid crystal alignment film and the liquid crystal layer when a voltage is not applied is improved by curing (polymerizing) the polymerizable composition included in the liquid crystal alignment film by applying light in a state in which the liquid crystal molecules are not driven. It is considered that the liquid crystal display produced by the above method thus exhibits excellent burn-in resistance, and rarely shows a deterioration in electrical properties due to continuous drive for a long time.

A polarizer is bonded to the outer surface of the liquid crystal cell to produce the liquid crystal display according to one embodiment of the invention. The desired liquid crystal display can be obtained by appropriately adjusting the angle formed by the polarization direction of linearly polarized radiation and the substrates on which the liquid crystal alignment film is formed, and the angle formed by each substrate and the polarizer.

Examples of the polarizer that is bonded to the outer surface of the liquid crystal cell include a polarizer in which a polarizing film (H film) obtained by stretching polyvinyl alcohol while effecting absorption of iodine is interposed between cellulose acetate protective films, a polarizer formed of the H film, and the like.

The pretilt angle of the liquid crystal molecules included in the liquid crystal layer is preferably 10° or less. When producing an in-plane switching liquid crystal display, the pretilt angle is preferably 3° or less, and more preferably 1° or less.

The liquid crystal display obtained by the above method is preferably an in-plane switching liquid crystal display.

The liquid crystal alignment film formed using the liquid crystal aligning agent according to one embodiment of the invention suppresses a deterioration in electrical properties due to continuous drive for a long time when applied to an in-plane switching liquid crystal display (e.g., IPS-mode liquid crystal display or FFS-mode liquid crystal display). Therefore, the liquid crystal alignment film formed using the liquid crystal aligning agent according to one embodiment of the invention may suitably be used for an in-plane switching liquid crystal display.

EXAMPLES

The invention is further described below by way of examples. Note that the invention is not limited to the following examples.

In the following synthesis examples, the weight average molecular weight (Mw) refers to the polystyrene-reduced weight average molecular weight determined by gel permeation chromatography under the following conditions.
Column: TSKgel GRCXLII manufactured by Tosoh Corporation
Eluant: tetrahydrofuran
Temperature: 40° C.
Pressure: 68 kgf/cm$^2$ In the following synthesis examples, the raw material compound or the polymer was optionally repeatedly synthesized within the following synthesis scale to obtain the desired amount of the raw material compound or the polymer.

Synthesis of Polyorganosiloxane [a]

Synthesis Example of Epoxy Group-Containing Polyorganosiloxane

Synthesis Example ES1

A reaction vessel equipped with a stirrer, a thermometer, a dropping funnel, and a reflux condenser was charged with 100.0 g of 2-(3,4-epoxycyclohexyl)ethyltrimethoxysilane, 500 g of methyl isobutyl ketone, and 10.0 g of triethylamine, which were mixed at room temperature. After the dropwise addition of 100 g of deionized water from the dropping funnel over 30 minutes, the mixture was reacted at 80° C. for 6 hours under reflux with stirring. After completion of the reaction, the organic layer was removed, and washed with a 0.2 wt % ammonium nitrate aqueous solution until water after washing was neutral, and the solvent and water were evaporated under reduced pressure to obtain an epoxy group-containing polyorganosiloxane (ES-1) as a viscous transparent liquid.

The epoxy group-containing polyorganosiloxane was subjected to $^1$H-NMR analysis. A peak attributed to an epoxy group was observed around a chemical shift (6) of 3.2 ppm corresponding to the theoretical intensity. It was thus confirmed that an epoxy group side reaction did not occur during the reaction. Table 1 shows the Mw and the epoxy equivalent of the epoxy group-containing polyorganosiloxane (ES-1).

Synthesis Examples ES2 to ES4

Epoxy group-containing polyorganosiloxanes (ES-2) to (ES-4) were respectively obtained as a viscous transparent liquid in the same manner as in Synthesis Example ES1, except that the raw material was changed as shown in Table 1. Table 1 shows the Mw and the epoxy equivalent of each epoxy group-containing polyorganosiloxane. The abbreviations for the raw material silane compounds in Table 1 have the following meanings ECETS: 2-(3,4-epoxycyclohexyl)ethyltrimethoxysilane
MTMS: methyltrimethoxysilane
PTMS: phenyltrimethoxysilane
MPTMS: 3-methacryloxypropyltrimethoxysilane
TEOS: tetraethoxysilane Synthesis Example ES5

A reaction vessel equipped with a stirrer and a thermometer was charged with 90 g of methyl isobutyl ketone, 7.5 g of water, 4.6 g of a 25 wt % tetramethylammonium hydroxide aqueous solution, and 90 g of the compound represented by the formula (s1-1). The mixture was reacted at 55° C. for 3 hours. After completion of the reaction, 270 g of methyl isobutyl ketone was added to the mixture, and the mixture was washed ten times with 50 mL of water. The solvent and water were evaporated from the organic layer under reduced pressure to obtain 60 g of a polyorganosiloxane (ES-5). The polyorganosiloxane (ES-5) had an Mw of 2800 and an epoxy equivalent of 165 g/mol.

Synthesis Example ES6

A reaction vessel equipped with a stirrer, a thermometer, a dropping funnel, and a reflux condenser was charged with 70.5 g of ECETS, 14.9 g of TEOS, 85.4 g of ethanol, and 8.8 g of triethylamine, which were mixed at room temperature. After the dropwise addition of 70.5 g of deionized water from the dropping funnel over 30 minutes, the mixture was reacted at 60° C. for 2 hours under reflux with stirring. After completion of the reaction, 256 g of butyl acetate was added to the mixture, and the mixture was concentrated to 183 g under reduced pressure. After the addition of 256 g of butyl acetate, the mixture was concentrated to 183 g to obtain an epoxy group-containing polyorganosiloxane (ES-6) having a solid content of 28% as a transparent liquid. The polyorganosiloxane (ES-6) had an Mw of 12,300 and an epoxy equivalent of 193 g/mol.

"compound (A1-4)", respectively) were obtained as described below (see Synthesis Examples A1-1 to A1-4).

Synthesis Example A1-1

A three-necked flask (500 mL) equipped with a condenser was charged with 20 g of 4-bromodiphenyl ether, 0.18 g of palladium acetate, 0.98 g of tris(2-tolyl)phosphine, 32.4 g of triethylamine, and 135 mL of dimethylacetamide, which were mixed to prepare a solution. After the addition of 7 g of acrylic acid to the solution using a syringe, the mixture was stirred, and reacted at 120° C. for 3 hours with stirring. After confirming completion of the reaction by thin-layer chromatography (TLC), the reaction solution was cooled to room temperature. After removing an insoluble component by filtration, the filtrate was poured into 300 mL of 1N hydrochloric acid, and a precipitate was collected. The precipitate was recrystallized from a mixed solvent (ethyl acetate:hexane=1:1 (volume ratio)) to obtain 8.4 g of the compound (A1-1).

Synthesis Example A1-2

A three-necked flask (300 mL) equipped with a condenser was charged with 6.5 g of 4-fluorophenylboronic acid, 10 g of 4-bromocinnamic acid, 2.7 g of tetrakis(triphenylphosphine)palladium, 4 g of sodium carbonate, and 39 mL of tetrahydrofuran, which were mixed, and reacted at 80° C. for 8 hours with stirring. After confirming completion of the reaction by TLC, the reaction mixture was cooled to room temperature. The reaction mixture was poured into 200 mL of 1N hydrochloric acid, and a precipitate was collected. A solution prepared by dissolving the precipitate in ethyl acetate was sequentially washed with 100 mL of 1N hydrochloric acid, 100 mL of purified water, and 100 mL of a saturated sodium chloride solution, and dried over anhydrous magnesium sulfate, and the solvent was evaporated. The resulting solid was dried under vacuum to obtain 9 g of the compound (A1-2).

Synthesis Example A1-3

A three-necked flask (200 mL) equipped with a condenser was charged with 3.6 g of 4-fluorostyrene, 6 g of 4-bromo-

TABLE 1

Synthesis of epoxy group-containing polyorganosiloxane

| | Raw material silane compound (g) | | | | | | Polyorganosiloxane | | |
|---|---|---|---|---|---|---|---|---|---|
| | ECETS | MTMS | PTMS | MPTMS | Compound (s1-1) | TEOS | Type | Mw | Epoxy equivalent (g/mol) |
| Synthesis Example ES1 | 100 | 0 | 0 | 0 | 0 | 0 | ES-1 | 2200 | 186 |
| Synthesis Example ES2 | 80 | 20 | 0 | 0 | 0 | 0 | ES-2 | 2500 | 210 |
| Synthesis Example ES3 | 80 | 0 | 20 | 0 | 0 | 0 | ES-3 | 2000 | 228 |
| Synthesis Example ES4 | 50 | 0 | 0 | 50 | 0 | 0 | ES-4 | 2300 | 388 |
| Synthesis Example ES5 | 0 | 0 | 0 | 0 | 90 | 0 | ES-5 | 2800 | 165 |
| Synthesis Example ES6 | 70.5 | 0 | 0 | 0 | 0 | 14.9 | ES-6 | 12,300 | 193 |

Synthesis Example of Compound Represented by Formula (A1)

Compounds respectively represented by the formulas (A1-1) to (A1-4) (hereinafter referred to as "compound (A1-1)", "compound (A1-2)", "compound (A1-3)", and cinnamic acid, 0.059 g of palladium acetate, 0.32 g of tris(2-tolyl)phosphine, 11 g of triethylamine, and 50 mL of dimethylacetamide, which were mixed to prepare a solution. The solution was reacted at 120° C. for 3 hours with stirring. After confirming completion of the reaction by TLC, the reaction mixture was cooled to room temperature. After removing an insoluble component by filtration, the filtrate was poured into 300 mL of 1N hydrochloric acid, and a precipitate was collected. The precipitate was recrystallized from ethyl acetate to obtain 4.1 g of the compound (A1-3).

Synthesis Example A1-4

A three-necked flask (500 mL) equipped with a condenser was charged with 19.2 g of 1-bromo-4-cyclohexylbenzene, 0.18 g of palladium acetate, 0.98 g of tris(2-tolyl)phosphine, 32.4 g of triethylamine, and 135 mL of dimethylacetamide, which were mixed to prepare a solution. After the addition of 7 g of acrylic acid to the solution using a syringe, the mixture was stirred. The mixture was heated and stirred at 120° C. for 3 hours. After confirming completion of the reaction by TLC, the reaction solution was cooled to room temperature. After removing an insoluble component by filtration, the filtrate was poured into 300 mL of a 1N hydrochloric acid aqueous solution, and a precipitate was collected. The precipitate was recrystallized from a mixture of ethyl acetate and hexane (=1:1 (mass ratio)) to obtain 10.2 g of the compound (A1-4).

Synthesis Example of Compound Represented by Formula (A2)

Compounds respectively represented by the formulas (A2-1) and (A2-2) (hereinafter referred to as "compound (A2-1)" and "compound (A2-2)", respectively) were obtained as described below (see Synthesis Examples A2-1 and A2-2).

Synthesis Example A2-1

A three-necked flask (200 mL) equipped with a condenser was charged with 10 g of phenyl acrylate, 11.3 g of 4-bromobenzoic acid, 0.13 g of palladium acetate, 0.68 g of tris(2-tolyl)phosphine, 23 g of triethylamine, and 100 mL of dimethylacetamide, which were mixed to prepare a solution. The solution was reacted at 120° C. for 3 hours with stirring. After confirming completion of the reaction by TLC, the reaction mixture was cooled to room temperature. After removing an insoluble component by filtration, the filtrate was poured into 500 mL of 1N hydrochloric acid, and a precipitate was collected. The precipitate was recrystallized from ethyl acetate to obtain 9.3 g of the compound (A2-1).

Synthesis Example A2-2

A three-necked flask (200 mL) equipped with a dropping funnel was charged with 10 g of 4-cyclohexylphenol, 6.3 g of triethylamine, and 80 mL of dehydrated tetrahydrofuran, which were mixed. After cooling the mixture using an ice bath, a solution prepared by dissolving 5.7 g of acryloyl chloride in 40 mL of dehydrated tetrahydrofuran was added dropwise to the mixture from the dropping funnel. After the dropwise addition, the mixture was stirred for 1 hour in an ice bath, allowed to return to room temperature, and reacted for 2 hours with stirring. After completion of the reaction, the mixture was filtered to remove salts produced during the reaction.

After washing an organic layer obtained by adding ethyl acetate to the filtrate with water, the solvent was removed under reduced pressure, followed by evaporation to dryness to obtain 12.3 g of 4-cyclohexylphenyl acrylate (intermediate). A three-necked flask (100 mL) equipped with a condenser was charged with 6 g of 4-cyclohexylphenyl acrylate, 5.7 g of 2-fluoro-4-bromobenzoic acid, 0.06 g of palladium acetate, 0.32 g of tris(2-tolyl)phosphine, 11 g of triethylamine, and 50 mL of dimethylacetamide, which were mixed to prepare a solution. The solution was reacted at 120° C. for 3 hours with stirring. After confirming completion of the reaction by TLC, the reaction mixture was cooled to room temperature. After removing an insoluble component by filtration, the filtrate was poured into 300 mL of 1N hydrochloric acid, and a precipitate was collected. The precipitate was recrystallized from ethyl acetate to obtain 3.4 g of the compound (A2-2).

Synthesis Example of Radiation-Sensitive Polyorganosiloxane

Synthesis Example S1

A three-necked flask (100 mL) was charged with 9.3 g of the epoxy group-containing polyorganosiloxane (ES-1) obtained in Synthesis Example ES1, 26 g of methyl isobutyl ketone, 3 g of the compound (A1-1) obtained in Synthesis Example A1-1, and 0.10 g of UCAT18X (quaternary amine salt manufactured by San-Apro Ltd.). The mixture was reacted at 80° C. for 12 hours with stirring. After completion of the reaction, the reaction mixture was added to methanol, and a precipitate was collected. The precipitate was dissolved in ethyl acetate to prepare a solution. After washing the solution three times with water, the solvent was evaporated to obtain 6.3 g of a radiation-sensitive polyorganosiloxane (S-1) as a white powder. The radiation-sensitive polyorganosiloxane (S-1) had an Mw of 3500.

Synthesis Example S2

A radiation-sensitive polyorganosiloxane (S-2) (7.0 g, white powder) was obtained in the same manner as in Synthesis Example S1, except that 3 g of the compound (A1-2) obtained in Synthesis Example A1-2 was used instead of the compound (A1-1). The radiation-sensitive polyorganosiloxane (S-2) had an Mw of 4900.

Synthesis Example S3

A radiation-sensitive polyorganosiloxane (S-3) (10 g, white powder) was obtained in the same manner as in Synthesis Example S1, except that 4 g of the compound (A1-3) obtained in Synthesis Example A1-3 was used instead of the compound (A1-1). The radiation-sensitive polyorganosiloxane (S-3) had an Mw of 5000.

Synthesis Example S4

A radiation-sensitive polyorganosiloxane (S-4) (6.5 g, white powder) was obtained in the same manner as in Synthesis Example S1, except that 3.1 g of the compound (A1-4) obtained in Synthesis Example A1-4 was used instead of the compound (A1-1). The radiation-sensitive polyorganosiloxane (S-4) had an Mw of 3900.

Synthesis Example S5

A radiation-sensitive polyorganosiloxane (S-5) (7.0 g, white powder) was obtained in the same manner as in Synthesis Example S1, except that 10.5 g of the epoxy group-containing polyorganosiloxane (ES-2) obtained in Synthesis Example ES2 was used instead of the epoxy group-containing polyorganosiloxane (ES-1), and 3.35 g of the compound (A2-1) obtained in Synthesis Example A2-1 was used instead of the compound (A1-1). The radiation-sensitive polyorganosiloxane (S-5) had an Mw of 5500.

Synthesis Example S6

A radiation-sensitive polyorganosiloxane (S-6) (9.6 g, white powder) was obtained in the same manner as in Synthesis Example S1, except that 11.4 g of the epoxy group-containing polyorganosiloxane (ES-3) obtained in Synthesis Example ES3 was used instead of the epoxy group-containing polyorganosiloxane (ES-1), and 4.6 g of the compound (A2-2) obtained in Synthesis Example A2-2 was used instead of the compound (A1-1). The radiation-sensitive polyorganosiloxane (S-6) had an Mw of 7400.

Synthesis Example S7

A radiation-sensitive polyorganosiloxane (S-7) (8.5 g, white powder) was obtained in the same manner as in Synthesis Example S1, except that 19.4 g of the epoxy group-containing polyorganosiloxane (ES-4) obtained in Synthesis Example ES4 was used instead of the epoxy group-containing polyorganosiloxane (ES-1), and 2.8 g of the compound (A1-1) was used. The radiation-sensitive polyorganosiloxane (S-7) had an Mw of 3200.

Synthesis Example S8

A radiation-sensitive polyorganosiloxane (S-8) (8 g, white powder) was obtained in the same manner as in Synthesis Example S1, except that 8.25 g of the polyorganosiloxane (ES-5) was used instead of the polyorganosiloxane (ES-1), and 2.3 g of 4-methoxycinnamic acid (compound represented by the formula (A1-5)) and 3.9 g of the compound (C-1) were used instead of the compound (A1-1). The radiation-sensitive polyorganosiloxane (S-8) had an Mw of 5200.

Synthesis Example S9

A radiation-sensitive polyorganosiloxane (S-9) (9 g, white powder) was obtained in the same manner as in Synthesis Example S1, except that 7.7 g (solid basis) of the polyorganosiloxane (ES-6) was used instead of the polyorganosiloxane (ES-1), and 3 g of the compound (A1-4) and 6 g of the compound (C-2) were used instead of the compound (A1-1). The radiation-sensitive polyorganosiloxane (S-9) had an Mw of 14,800.

Synthesis Example S10

A radiation-sensitive polyorganosiloxane (S-10) (10 g, white powder) was obtained in the same manner as in Synthesis Example S1, except that 1.5 g of the compound (A1-4), 1.2 g of 4-methoxycinnamic acid, and 7.5 g of the compound (C-3) were used instead of the compound (A1-1). The radiation-sensitive polyorganosiloxane (S-10) had an Mw of 5900.

Synthesis Example of Polyamic Acid

Synthesis Example of Polymer [c]

Synthesis Example PA-1

19.61 g (0.1 mol) of cyclobutanetetracarboxylic dianhydride and 21.23 g (0.1 mol) of 4,4'-diamino-2,2-dimethylbiphenyl were dissolved in 367.6 g of N-methyl-2-pyrrolidone, and reacted at room temperature for 6 hours. The reaction mixture was poured into a large excess of methanol to precipitate the reaction product. The reaction product (precipitate) was washed with methanol, and dried at 40° C. for 15 hours under reduced pressure to obtain 35 g of a polyamic acid (PA-1).

Synthesis Example of Polymer [a]

Synthesis Example rpa-1

23.81 g (0.106 mol) of 2,3,5-tricarboxycyclopentylacetic dianhydride and 36.19 g (0.106 mol) of the diamine represented by the formula (d-1) and having a side-chain cinnamate structure were dissolved in 150 g of N-methyl-2-pyrrolidone, and reacted at 40° C. for 12 hours. The reaction mixture was poured into a large excess of methanol to precipitate the reaction product. The reaction product (precipitate) was washed with methanol, and dried at 40° C. for 15 hours under reduced pressure to obtain 51 g of a polyamic acid (rpa-1).

Synthesis Example rpa-2

20.18 g (0.09 mol) of 2,3,5-tricarboxycyclopentylacetic dianhydride and 39.82 g (0.09 mol) of the diamine represented by the formula (d-1) and having a side-chain cinnamate structure were dissolved in 150 g of N-methyl-2-pyrrolidone, and reacted at 40° C. for 12 hours. The reaction mixture was poured into a large excess of methanol to precipitate the reaction product. The reaction product (precipitate) was washed with methanol, and dried at 40° C. for 15 hours under reduced pressure to obtain 48 g of a polyamic acid (rpa-2).

Synthesis Example of Additional Polymer

Synthesis Example PA-2

22.4 g (0.1 mol) of 2,3,5-tricarboxycyclopentylacetic dianhydride and 14.23 g (0.1 mol) of cyclohexanebis(methylamine) were dissolved in 329.3 g of N-methyl-2-pyrrolidone, and reacted at 60° C. for 6 hours. The reaction mixture was poured into a large excess of methanol to precipitate the reaction product. The reaction product (precipitate) was washed with methanol, and dried at 40° C. for 15 hours under reduced pressure to obtain 32 g of a polyamic acid (PA-2).

Synthesis Example of Polyimide

Synthesis Example PI-1

17.5 g of the polyamic acid PA-2 obtained in Synthesis Example PA-2 was dissolved in 232.5 g of N-methyl-2-pyrrolidone. After the addition of 3.8 g of pyridine and 4.9 g of acetic anhydride, the mixture was subjected to a dehydration/ring-closing reaction at 120° C. for 4 hours. After completion of the reaction, the reaction mixture was poured into a large excess of methanol to precipitate the reaction product. The reaction product (precipitate) was collected, washed with methanol, and dried for 15 hours under reduced pressure to obtain 15 g of a polyimide (PI-1).

Synthesis of polymer [b]

Synthesis Example b1

A flask (50 mL) was charged with 3 g (0.01 mol) of the compound represented by the following formula (DC-1) (dicarboxylic acid), 0.83 g (0.01 mol) of the compound represented by the following formula (DE-1) (diepoxy compound), and 10 g of N-methyl-2-pyrrolidone (solvent). The mixture was reacted at 140° C. for 6 hours while stirring to obtain a solution including a polymer (SP-1). The polymer (SP-1) included in the solution had an Mw of 4200.

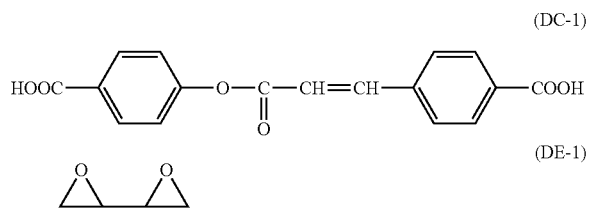

Example 1

Preparation of Liquid Crystal Aligning Agent 100 parts by weight of the radiation-sensitive polyorganosiloxane (S-1) obtained in Synthesis Example S1 (radiation-sensitive polyorganosiloxane), 300 parts by weight of dipentaerythritol hexaacrylate (B-1) (component that includes a polymerizable carbon-carbon double bond), and 1000 parts by weight of the polyamic acid (PA-1) obtained in Synthesis Example PA-1 (additional polymer) were mixed, and N-methyl-2-pyrrolidone and butyl cellosolve were added to the mixture to prepare a solution (N-methyl-2-pyrrolidone:butyl cellosolve=50:50 (weight ratio)) having a solid content of 3.0 wt %. The solution was filtered through a filter having a pore size of 0.2 µm to prepare a liquid crystal aligning agent.

Production of IPS-Mode Liquid Crystal Display

A glass substrate and a common glass substrate (on which an electrode was not formed) were provided, metal electrodes (two systems) made of chromium and patterned in a comb-like configuration being formed on one side of the glass substrate. The liquid crystal aligning agent prepared as described above was applied to the side of the glass substrate on which the electrodes were formed, and one side of the common glass substrate using a spinner. The applied liquid crystal aligning agent was prebaked on a hot plate (80° C.) for 1 minute, and post-baked at 200° C. for 1 hour in an oven (of which the internal atmosphere was replaced with nitrogen) to obtain a film having a thickness of 0.1 µm. FIG. 1 schematically illustrates the configuration of the electrode pattern formed on the glass substrate. The conductive film patterns (metal electrodes) (two systems) included in the IPS-mode liquid crystal display are hereinafter referred to as "electrode A" and "electrode B", respectively.

Polarized UV light (300 J/m²) including a bright line (313 nm) was applied to the surface of the film in the direction normal to the substrate using an Hg—Xe lamp and a Glan-Taylor prism to obtain a pair of substrates provided with a liquid crystal alignment film. Note that UV light was applied in a state in which a voltage was not applied.

An epoxy resin adhesive including aluminum oxide balls (diameter: 5.5 µm) was applied by screen printing to the outer periphery of the side of one of the substrates on which the liquid crystal alignment film was formed. The substrates were stacked so that the liquid crystal alignment films faced each other, and the direction of each substrate was reversed as compared with that when polarized UV light was applied, and compression-bonded at 150° C. for 1 hour to thermally cure the adhesive. The gap between the substrates was filled with a liquid crystal ("MLC-7028" manufactured by Merck) through a liquid crystal injection hole, and the liquid crystal injection hole was sealed with an epoxy-based adhesive. In order to remove the flow alignment that occurred when injecting the liquid crystal, the liquid crystal was heated to 150° C., gradually cooled to room temperature, and irradiated with UV light (dose: 100 J/m² (λ=365 nm)) from the outside of the liquid crystal cell. UV light was applied in a state in which the electrodes were not electrically connected, and a voltage was not applied. A polarizer was bonded to the outer side (surface) of each substrate so that the polarization directions were orthogonal to each other, and were orthogonal to the projection direction of the optical axis of the polarized UV light with respect to the surface of the substrate to produce a liquid crystal display. The liquid crystal alignment properties and the burn-in resistance were evaluated using the resulting liquid crystal display.

Evaluation of Liquid Crystal Display

The liquid crystal display produced as described above was evaluated as described below. The evaluation results are shown in Table 2.

(1) Evaluation of Liquid Crystal Alignment Properties

The presence or absence of an abnormal domain (i.e., an abnormal change in brightness) in the liquid crystal display when a voltage of 5 V was applied/removed (ON/OFF) was observed using an optical microscope. The liquid crystal alignment properties were evaluated as "Acceptable" when an abnormal domain was not observed, and evaluated as "Unacceptable" when an abnormal domain was observed.

(2) Evaluation of Burn-in Resistance

The IPS-mode liquid crystal display was placed in an environment at a temperature of 25° C. under a pressure of 1 atmospheres, and a composite voltage of an AC voltage (3.5 V) and a DC voltage (5 V) was applied to the electrode A for 2 hours without applying a voltage to the electrode B. An AC voltage of 4V was applied to both the electrode A and the electrode B immediately after 2 hours had elapsed. The time until the difference in optical transparency between the electrode A and the electrode B was not observed with the naked eye after applying an AC voltage of 4V to both the electrode A and the electrode B was measured. The burn-in resistance was evaluated as "Excellent" when the measured time was less than 20 seconds, evaluated as "Very Good" when the measured time was 20 seconds or more and less than 60 seconds, evaluated as "Good" when the measured time was 60 seconds or more and less than 100 seconds, evaluated as "Fair" when the measured time was 100 seconds or more and less than 150 seconds, and evaluated as "Poor" when the measured time was more than 150 seconds.

(3) Evaluation of Light Resistance

Light was applied to the liquid crystal display produced as described above for 3000 hours using a weatherometer (light source: carbon electric arc), and the voltage holding ratio (VHR) was measured. Specifically, a voltage of 5 V was applied for 60 µs within a span of 167 msec, and the voltage holding ratio was measured when 167 msec had elapsed after stopping the application of the voltage. The voltage holding ratio was measured using VHR-1 manufactured by Toyo Corporation. The light resistance was evaluated as "Good" when a change in VHR was 2% or less with respect to the value measured before applying light, evaluated as "Fair" when a change in VHR was 2 to 5% with respect to the value measured before applying light, and evaluated as "Poor" when a change in VHR was more than 5% with respect to the value measured before applying light.

Examples 2 to 16 and Comparative Examples 1 and 2

A liquid crystal aligning agent was prepared in the same manner as in Example 1, except that the types and the amounts of compounds were changed as shown in Table 2. In Examples 2 to 14 and Comparative Examples 1 and 2, a liquid crystal display was produced, and evaluated in the same manner as in Example 1, except that the resulting liquid crystal aligning agent was used. In Examples 15 and 16, a liquid crystal display was produced, and evaluated in the same manner as in Example 1, except that the resulting liquid crystal aligning agent was used, and polarized UV light was applied as described below. The evaluation results are shown in Table 2.

In Example 15, polarized UV light (5000 J/m$^2$) including a bright line (313 nm) was applied in the direction normal to the substrate using an Hg—Xe lamp and a Glan-Taylor prism. In Example 16, polarized UV light (10,000 J/m$^2$) including a bright line (254 nm) was applied in the direction normal to the substrate using an Hg—Xe lamp and a Glan-Taylor prism.

In Table 2, B-2 is ethoxylated bisphenol A diacrylate ("A-BPE-10" manufactured by Shin-Nakamura Chemical Co., Ltd.), B-3 is ethoxylated bisphenol A dimethacrylate ("BPE-500" manufactured by Shin-Nakamura Chemical Co., Ltd.), B-4 is acryloyl group-containing silsesquioxane ("AC-SQTA-100" manufactured by
Toagosei Co., Ltd.), and B-5 is methacryloyl group-containing silsesquioxane ("MAC-SQTA-100" manufactured by Toagosei Co., Ltd.).

Examples 17 to 24

A liquid crystal aligning agent was prepared in the same manner as in Example 1, except that the types and the amounts of compounds were changed as shown in Table 3. A liquid crystal display was produced using the resulting liquid crystal aligning agent. In Examples 17 to 20, UV light was applied to the liquid crystal from the outside of the liquid crystal cell in a state in which the electrodes were electrically connected (short-circuited) without applying a voltage. In Examples 21 to 24, UV light was applied to the liquid crystal from the outside of the liquid crystal cell in a state in which the electrodes were electrically connected while applying a voltage of 0 V. In Examples 17 to 24, UV light was applied to the liquid crystal from the outside of the liquid crystal cell after removing electricity from the liquid crystal cell using an ionizer (fan). The liquid crystal display was evaluated in the same manner as in Example 1. The evaluation results are shown in Table 3.

In Example 22, UV light was applied to the liquid crystal from the outside of the liquid crystal cell at a dose of 20,000 J/m$^2$ ($\lambda$=365 nm). In Example 23, UV light including a bright line (365 nm) was applied to the liquid crystal from the outside of the liquid crystal cell at a dose of 100,000 J/m$^2$ using an Hg—Xe lamp and a Glan-Taylor prism. In Example 24, UV light including a bright line (365 nm) was applied to the liquid crystal from the outside of the liquid crystal cell at a dose of 20,000 J/m$^2$. The direction of the polarization axis of the polarized UV light applied from the outside of the liquid crystal cell was identical with the direction of the polarization axis of the polarized UV light applied to the liquid crystal alignment film.

In Table 3, E-1 is 3-carboxymethylcyclopentane-1,2,4-tricarboxylic acid.

TABLE 2

| | Radiation-sensitive polymer | | Additional polymer | | Unsaturated compound | | Liquid crystal alignment properties | Burn-in resistance | Light resistance | |
|---|---|---|---|---|---|---|---|---|---|---|
| | Type | Amount (parts by mass) | Type | Amount (parts by mass) | Type | Amount (parts by mass) | | | Reliability | ΔVHR (%) |
| Example 1 | S-1 | 100 | PA-1 | 1000 | B-1 | 300 | Acceptable | Good | Good | 1.5 |
| Example 2 | S-2 | 100 | PA-1 | 1000 | B-2 | 300 | Acceptable | Good | Good | 1.5 |
| Example 3 | S-3 | 100 | PA-1 | 1000 | B-3 | 300 | Acceptable | Good | Good | 1.5 |
| Example 4 | S-4 | 100 | PA-1 | 1000 | B-4 | 300 | Acceptable | Good | Good | 1.5 |
| Example 5 | S-2 | 100 | PA-2 | 1000 | B-5 | 300 | Acceptable | Good | Good | 1.5 |
| Example 6 | S-2 | 100 | PI-1 | 1000 | B-1 | 100 | Acceptable | Good | Good | 1.0 |
| Example 7 | S-2 | 100 | PA-1 | 1000 | B-1 | 500 | Acceptable | Good | Good | 1.5 |
| Example 8 | S-5 | 100 | PA-1 | 1000 | B-1 | 300 | Acceptable | Good | Good | 1.5 |
| Example 9 | S-6 | 100 | PA-1 | 1000 | B-1 | 300 | Acceptable | Good | Good | 1.5 |
| Example 10 | S-5 | 100 | PA-1 | 2000 | B-1 | 300 | Acceptable | Good | Good | 2.0 |
| Example 11 | S-6 | 100 | PA-1 | 500 | B-1 | 300 | Acceptable | Good | Good | 1.0 |
| Example 12 | S-7 | 100 | PA-1 | 1000 | | | Acceptable | Good | Good | 1.5 |
| Example 13 | S-7 | 100 | PA-1 | 1000 | B-1 | 300 | Acceptable | Good | Good | 1.5 |
| Example 14 | rpa-1 | 1000 | | | B-1 | 300 | Acceptable | Good | Fair | 3.1 |
| Example 15 | SP-1 | 1000 | | | B-1 | 300 | Acceptable | Good | Good | 2.5 |
| Example 16 | PA-1 | 1000 | | | B-1 | 300 | Acceptable | Good | Good | 2.1 |
| Comparative Example 1 | S-1 | 100 | PA-1 | 1000 | | | Acceptable | Poor | Good | 1.5 |
| Comparative Example 2 | S-6 | 100 | PA-1 | 1000 | | | Acceptable | Poor | Good | 1.5 |

TABLE 3

| | Radiation-sensitive polysiloxane | | Additional polymer | | Compound that includes polymerizable carbon-carbon double bond | | Curing agent | |
|---|---|---|---|---|---|---|---|---|
| | Type | Amount (parts by weight) | Type | Amount (parts by weight) | Type | Amount (parts by weight) | Type | Amount (parts by weight) |
| Example 17 | S-1 | 100 | PA-1 | 1000 | B-1 | 300 | E-1 | 300 |
| Example 18 | S-8 | 100 | PA-1 | 1000 | | | | |
| Example 19 | S-9 | 100 | PA-1 | 1000 | | | | |
| Example 20 | S-10 | 100 | PA-1 | 1000 | | | | |
| Example 21 | rpa-2 | 1000 | | | B-1 | 300 | | |
| Example 22 | S-9 | 100 | PA-1 | 1000 | | | | |
| Example 33 | S-9 | 100 | PA-1 | 1000 | | | | |
| Example 24 | S-9 | 100 | PA-1 | 1000 | | | | |

| | UV irradiation | | Liquid crystal alignment properties | Burn-in resistance | Light resistance | | |
|---|---|---|---|---|---|---|---|
| | Type | Dose (J/m$^2$) | | | Reliability | ΔVHR (%) | |
| Example 17 | Unpolarized | 100,000 | Acceptable | Good | Good | 1.0 | |
| Example 18 | Unpolarized | 100,000 | Acceptable | Good | Good | 1.5 | |
| Example 19 | Unpolarized | 100,000 | Acceptable | Very Good | Good | 1.5 | |
| Example 20 | Unpolarized | 100,000 | Acceptable | Very Good | Good | 1.5 | |
| Example 21 | Unpolarized | 100,000 | Acceptable | Good | Fair | 2.7 | |
| Example 22 | Unpolarized | 20,000 | Acceptable | Good | Good | 1.5 | |
| Example 33 | Polarized | 100,000 | Acceptable | Very Good | Good | 1.5 | |
| Example 24 | Polarized | 20,000 | Acceptable | Very Good | Good | 1.5 | |

As shown in Tables 2 and 3, the IPS-mode liquid crystal displays including the liquid crystal alignment film formed using the liquid crystal aligning agent obtained in each example exhibited satisfactory liquid crystal alignment properties, excellent burn-in resistance, and excellent light resistance.

Production of FFS-Mode Liquid Crystal Display

Example 25

Formation of Liquid Crystal Alignment Film

The liquid crystal aligning agent of Example 1 was applied using a spinner to the side of a substrate on which a common electrode, an insulating layer, and a signal electrode were sequentially formed, and one side of a common substrate on which a common electrode and the like were not formed. Note that the signal electrode was a comb-like electrode having linear teeth, and the common electrode was formed by an unpatterned solid film. The resulting film was prebaked at 80° C. for 1 minute, and post-baked at 200° C. for 1 hour to form a liquid crystal alignment film having an average thickness of 0.1 µm. Polarized UV light (300 J/m$^2$) including a bright line (313 nm) was applied to the surface of the film in the direction normal to the substrate using an Hg—Xe lamp and a Glan-Taylor prism to obtain a pair of substrates provided with a liquid crystal alignment film.

Production and Evaluation of Liquid Crystal Display

An FFS-mode liquid crystal display illustrated in FIG. 2 was produced, and operated. The substrates were placed through a spacer having a thickness of 10 µm so that the liquid crystal alignment films faced each other, and the side surface excluding the liquid crystal injection hole was sealed. The space between the substrates was filled with a liquid crystal ("MLC-7028" manufactured by Merck) through the liquid crystal injection hole, and the liquid crystal injection hole was sealed. In order to remove the flow alignment that occurred when injecting the liquid crystal, the liquid crystal was heated to 120° C., gradually cooled to room temperature, and irradiated with UV light (dose: 100 J/m$^2$ (λ=365 nm)) from the outside of the liquid crystal cell. A polarizer was bonded to the outer side of each substrate to produce an FFS-mode liquid crystal display. The polarizers were bonded so that the polarization directions were orthogonal to each other, and were parallel or vertical to the extension direction of the teeth of the signal electrode. A backlight (not illustrated in FIG. 2) was disposed under the lower substrate (see FIG. 2). The liquid crystal alignment properties, the burn-in resistance, and the light resistance were evaluated in the same manner as in Example 1 using the resulting liquid crystal display. The FFS-mode liquid crystal display exhibited excellent liquid crystal alignment properties, burn-in resistance, and light resistance. Therefore, it is considered that the FFS-mode liquid crystal display rarely shows a deterioration in electrical properties due to continuous drive for a long time while exhibiting satisfactory liquid crystal alignment properties and excellent burn-in resistance.

The liquid crystal aligning agent according to the embodiments of the invention can form a liquid crystal alignment film that ensures excellent burn-in resistance, and can maintain liquid crystal alignment properties and electrical properties when a liquid crystal display (particularly an IPS-mode liquid crystal display or FFS-mode liquid crystal display) is continuously driven for a long time (or exposed to light for a long time).

Obviously, numerous modifications and variations of the present invention are possible in light of the above teachings. It is therefore to be understood that within the scope of the appended claims, the invention may be practiced otherwise than as specifically described herein.

The invention claimed is:

1. A method for producing a liquid crystal display, comprising steps of:
    providing a first substrate having a first electrode and a second electrode on a surface of the first substrate, the first electrode and the second electrode being made of conductive films;
    forming an alignment film on the surface of the first substrate covering the first electrode and the second electrode, wherein the alignment film is formed using a liquid crystal aligning agent, the liquid crystal aligning agent including a polymerizable composition including at least one of:
        a polymer that includes a photoalignment structure and a polymerizable carbon-carbon double bond; or
        a polymer that includes a photoalignment structure, and a component that includes a polymerizable carbon-carbon double bond; or a combination of
        a polymer that includes a photoalignment structure and a polymerizable carbon-carbon double bond, and a component that includes a polymerizable carbon-carbon double bond;
    providing a second substrate to sandwich a liquid crystal layer between the alignment film on the first substrate and the second substrate to form a liquid crystal cell, the liquid crystal layer including liquid crystal molecules; and
    applying light to the liquid crystal cell in a state in which a voltage that does not drive the liquid crystal molecules included in the liquid crystal layer is applied between the first electrode and the second electrode, or in a state in which a voltage is not applied between the first electrode and the second electrode, so as to cure the polymerizable composition.

2. The method according to claim 1, further comprising:
    allowing the first electrode and the second electrode to be electrically connected and a voltage not to be applied between the first electrode and the second electrode, while the light is applied to the liquid crystal cell.

3. The method according to claim 1, further comprising:
    allowing the first electrode and the second electrode not to be electrically connected and a voltage not to be applied between the first electrode and the second electrode, while the light is applied to the liquid crystal cell.

4. The method according to claim 1, further comprising:
    removing electricity from the liquid crystal cell using a neutralization device before the light is applied to the liquid crystal cell, or when the light is applied to the liquid crystal cell.

5. The method according to claim 1, which produces an in-plane switching liquid crystal display as the liquid crystal display.

* * * * *